(12) United States Patent
Tanaka et al.

(10) Patent No.: US 8,153,307 B1
(45) Date of Patent: Apr. 10, 2012

(54) BATTERY INCLUDING ELECTROLYTE WITH MIXED SOLVENT

(75) Inventors: Manabu Tanaka, Valencia, CA (US); Sang Young Yoon, Saugus, CA (US); Hiroshi Nakahara, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 1031 days.

(21) Appl. No.: 11/165,406

(22) Filed: Jun. 22, 2005

Related U.S. Application Data

(63) Continuation-in-part of application No. 10/971,912, filed on Oct. 21, 2004, now Pat. No. 7,718,321, and a continuation-in-part of application No. 11/053,338, filed on Feb. 8, 2005, now Pat. No. 7,771,496, and a continuation-in-part of application No. 11/056,869, filed on Feb. 10, 2005, now Pat. No. 8,076,032, which is a continuation-in-part of application No. 10/971,926, filed on Oct. 21, 2004, now abandoned, and a continuation-in-part of application No. 10/971,913, filed on Oct. 21, 2004, now abandoned, and a continuation-in-part of application No. 10/971,507, filed on Oct. 21, 2004, now abandoned, application No. 11/165,406, which is a continuation of application No. 10/977,313, filed on Oct. 28, 2004, now abandoned, which is a continuation-in-part of application No. 10/962,125, filed on Oct. 7, 2004, now abandoned, which is a continuation-in-part of application No. 10/810,019, filed on Mar. 25, 2004, now abandoned, and a continuation-in-part of application No. 10/810,080, filed on Mar. 25, 2004, now Pat. No. 7,588,859.

(60) Provisional application No. 60/601,452, filed on Aug. 13, 2004, provisional application No. 60/543,951, filed on Feb. 11, 2004.

(51) Int. Cl.
*H01M 6/18* (2006.01)

(52) U.S. Cl. ........ 429/313; 429/317; 429/303; 429/326; 429/330; 429/332; 429/338

(58) Field of Classification Search .................. 429/313, 429/317, 303, 326, 330, 332, 338
See application file for complete search history.

(56) References Cited

U.S. PATENT DOCUMENTS

| | | |
|---|---|---|
| 3,172,899 A | 3/1965 | Bailey |
| 3,530,159 A | 9/1970 | Gulnet et al. |
| 3,734,876 A | 5/1973 | Chu |
| 4,259,467 A | 3/1981 | Keogh et al. |
| 4,830,939 A | 5/1989 | Lee et al. |
| 4,849,856 A | 7/1989 | Funari et al. |
| 4,908,283 A | 3/1990 | Takahashi et al. |
| 5,037,712 A | 8/1991 | Shackle et al. |
| 5,112,512 A | 5/1992 | Nakamura |
| 5,272,021 A | 12/1993 | Asai et al. |
| 5,300,375 A | 4/1994 | Chaloner-Gill |
| 5,362,493 A | 11/1994 | Skotheim et al. |
| 5,419,984 A | 5/1995 | Chaloner-Gill et al. |
| 5,475,127 A | 12/1995 | Klein et al. |
| 5,538,812 A | 7/1996 | Lee et al. |
| 5,593,787 A | 1/1997 | Dauth et al. |
| 5,609,974 A | 3/1997 | Sun |
| 5,633,098 A | 5/1997 | Narang et al. |
| 5,690,702 A | 11/1997 | Skotheim et al. |
| 5,700,300 A | 12/1997 | Jensen et al. |
| 5,731,104 A | 3/1998 | Ventura et al. |
| 5,753,389 A | 5/1998 | Gan et al. |
| 5,772,934 A | 6/1998 | MacFadden |
| 5,882,812 A | 3/1999 | Visco et al. |
| 5,885,733 A | 3/1999 | Ohsawa et al. |
| 5,919,587 A | 7/1999 | Mukherjee et al. |
| 5,961,672 A | 10/1999 | Skotheim et al. |
| 6,013,393 A | 1/2000 | Taniuchi et al. |
| 6,015,638 A | 1/2000 | Ventura et al. |
| 6,124,062 A | 9/2000 | Horie et al. |
| 6,168,885 B1 | 1/2001 | Narang et al. |
| 6,181,545 B1 | 1/2001 | Amatucci et al. |
| 6,210,835 B1 | 4/2001 | Arai |
| 645,465 A1 | 6/2001 | Angell et al. |
| 6,248,481 B1 | 6/2001 | Visco et al. |

(Continued)

FOREIGN PATENT DOCUMENTS

EP          0 450 981 A1      10/1991

(Continued)

OTHER PUBLICATIONS

M. Armand, New Electrode Material, Proceedings of the NATO Sponsored Advanced Study Institute on Fast Ion Transport in Sands, Solid State Batteries and Devices, 1972, Beigirate, Italy. D. Fenton et al., Complexes of Alkali Metal Ions with Poly(Ethylene Oxide). Polymer, Nov. 1973, 589, 14.
S. Kohama at al., Alcoholysis of Poly(methylhydroganalloxane), Journal of Applied Polymer Science. 1977, 21, 863-867.
E. Tsuchida at al., Conduction of Lithium Ions in Polyvinylidene Fluoride and Its Derivates-I. Electrochirnica Acta, 1983, 591-595, 28(5).
L. Hardy at al., Chloride Ion Conductivity in a Plasticized Quaternary Ammonium Polymer, Macromolecules, 1984, 975-977, 17.
P. Blonsky et al.. Polyphosphazene Solid Electrolytes, Journal of American Chemical Society. 1984, 6854-6855. 106.

(Continued)

*Primary Examiner* — Laura Weiner
(74) *Attorney, Agent, or Firm* — Gavrilovich, Dodd & Lindsey, LLP

(57) ABSTRACT

A battery is disclosed. The battery includes an electrolyte activating one or more anodes and one or more cathodes. The electrolyte includes one or more salts dissolved in a solvent. The solvent includes one or more first siloxanes and/or one or more first silanes. Each of the first siloxanes and/or first silanes have one or more first substituents that each include a poly(alkylene oxide) moiety. The solvent also includes one or more second siloxanes and/or one or more second silanes. Each of the second siloxanes and/or second silanes have one or more second substituents that each include a carbonate moiety.

90 Claims, 7 Drawing Sheets

U.S. PATENT DOCUMENTS

| | | |
|---|---|---|
| 6,252,762 B1 | 6/2001 | Amatucci |
| 6,268,088 B1 | 7/2001 | Oh et al. |
| 6,337,383 B1 | 1/2002 | West et al. |
| 6,447,952 B1 | 9/2002 | Spiegel et al. |
| 6,482,912 B2 | 11/2002 | Boudjouk et al. |
| 6,495,287 B1 | 12/2002 | Kolb et al. |
| 6,573,009 B1 | 6/2003 | Noda et al. |
| 6,610,109 B2 | 8/2003 | Noh |
| 6,653,015 B2 | 11/2003 | Yoshida et al. |
| 2002/0028388 A1 | 3/2002 | Lee |
| 2002/0051911 A1* | 5/2002 | Okada ............... 429/313 |
| 2002/0192554 A1 | 12/2002 | Woo et al. |
| 2003/0036003 A1 | 2/2003 | Shchori et al. |
| 2003/0099884 A1 | 5/2003 | Chiang et al. |
| 2003/0104282 A1 | 6/2003 | Xing et al. |
| 2003/0180624 A1 | 9/2003 | Oh et al. |
| 2003/0180625 A1 | 9/2003 | Oh et al. |
| 2003/0198869 A1 | 10/2003 | West et al. |
| 2004/0197668 A1 | 10/2004 | Jung et al. |
| 2004/0248014 A1* | 12/2004 | West et al. ............ 429/313 |

FOREIGN PATENT DOCUMENTS

| | | |
|---|---|---|
| EP | 0 525 728 A1 | 2/1993 |
| EP | 0 581 296 A2 | 2/1994 |
| EP | 0 581 296 A3 | 2/1994 |
| EP | 0 922 049 B1 | 2/1998 |
| EP | 0 932 215 A1 | 1/1999 |
| EP | 0 796 511 B1 | 8/1999 |
| EP | 1 024 502 | 8/2000 |
| EP | 0 932 215 | 5/2001 |
| EP | 1 202 374 A1 | 5/2002 |
| JP | 59-224072 A2 | 12/1964 |
| JP | 57-034661 | 2/1982 |
| JP | 57-034662 | 2/1982 |
| JP | 57-080670 | 5/1982 |
| JP | 57-111957 | 7/1982 |
| JP | 57-176669 A2 | 10/1982 |
| JP | 60-195877 | 10/1985 |
| JP | 60-216461 | 10/1985 |
| JP | 61-268374 | 12/1986 |
| JP | 62-209169 A2 | 9/1987 |
| JP | 63-010468 | 1/1988 |
| JP | 63-310569 | 12/1988 |
| JP | 02-080462 | 3/1990 |
| JP | 02-262274 | 10/1990 |
| JP | 02-291603 | 12/1990 |
| JP | 03-139566 | 6/1991 |
| JP | 60-052893 A2 | 7/1992 |
| JP | 05-036441 | 2/1993 |
| JP | 05-290816 | 11/1993 |
| JP | 07-320782 | 12/1995 |
| JP | 11-214032 A2 | 1/1996 |
| JP | 08-078053 A2 | 3/1996 |
| JP | 09-306544 | 11/1997 |
| JP | 10-172615 A2 | 6/1998 |
| JP | 11-165804 | 7/1999 |
| JP | 11-238523 | 8/1999 |
| JP | 11-302383 | 11/1999 |
| JP | 11-302384 A2 | 11/1999 |
| JP | 11-306856 A2 | 11/1999 |
| JP | 11-306857 A2 | 11/1999 |
| JP | 2000-058123 | 2/2000 |
| JP | 2000-154254 | 6/2000 |
| JP | 2000-222938 A2 | 8/2000 |
| JP | 2000-277152 A2 | 10/2000 |
| JP | 2001-068115 | 3/2001 |
| JP | 2001-110455 A2 | 4/2001 |
| JP | 2001-185165 A2 | 7/2001 |
| JP | 2001-283907 A2 | 10/2001 |
| JP | 2001-283913 | 10/2001 |
| JP | 2002-053936 A2 | 2/2002 |
| JP | 2002-151150 A2 | 5/2002 |
| JP | 2002 155142 A2 | 5/2002 |
| JP | 2002-296913 A2 | 10/2002 |
| JP | 2002- 343440 A2 | 11/2002 |
| JP | 2003- 002974 A2 | 1/2003 |
| JP | 2004- 235141 | 8/2004 |
| WO | WO 96/21953 | 7/1996 |
| WO | WO 98/07729 A1 | 2/1998 |
| WO | WO 00/00495 A1 | 1/2000 |
| WO | WO 00/08654 | 2/2000 |
| WO | WO 00/25323 A1 | 5/2000 |
| WO | WO 01/73884 A1 | 10/2001 |
| WO | WO 01/96446 A1 | 12/2001 |
| WO | WO 01/99209 A2 | 12/2001 |
| WO | WO 03/083970 A1 | 10/2003 |
| WO | WO 03/083971 A1 | 10/2003 |
| WO | WO 03/083972 A1 | 10/2003 |
| WO | WO 03/083973 A1 | 10/2003 |
| WO | WO 03/083974 A1 | 10/2003 |
| WO | WO 03/090299 A1 | 10/2003 |

OTHER PUBLICATIONS

D. Bannister at al., A Water-Soluble Slioxane: Poly(ethylene glycol) Comb Polymer, Journal of Polymer Science: Polymer Letters Edition, 1985, 465-467, 23.

I. Kelly at al., Poly(Ethylene Oxide) Electrolytes for Operation at Near Room Temperature, Journal of Power Sources, 1985, 13-21, 14.

D. Fish et al., Conductivity of Solid Complexes of Lithium Parchlorate with Poly([w-methoxyhexe(oxyethylene)ethoxy]methylsiloxane) I), Makromol. Chem., Rapid Commun., 1988, 115-120, 7.

P. Hall at al. Ion Conductivity in Polysiloxane Comb Polymers With Ethylene Glycol Teeth, Polymer Communications, 1986, 3 pages, 27.

D.R. MacFarlane et al., Synthesis and Aqueous Solution Phase Behavior of Siloxane-Poly (Alkylene Glycol) Comb Copolymers, Department of Chemistry, Monash University, Clayton, Victoria, Austrailia, *Polymer Preprints*, 1987, 29, 405-406.

D. Fish at al., Polymer Electrolyte Complexes of $ClO_4$ and Comb Polymers of Siloxane with Oligo-oxyethylene Side Chains, British Polymer Journal. 1988, 281-288, 20, 3.

S. Ganapathiappan et al., A New as of Cation Conductors: Polyphosphazene Sulfonates, Macromolecules, 1988, 2299-2301, 21.

I. Khan at al., Combilke Polysiloxanes with Oligo(oxyethylene) Side Chains, Synthesis and Properties, Macromolecules, 1988, 2684-2689, 21.

R. Spindler et al., Investigations of a Siloxane-Based Polymer Electrolyte Employing $^{13}$C, $^{29}$Si, $^{7}$Li, and $^{22}$Na Solid State NMR Spectroscopy, Journal of American Chemical Society, 1988, 3036-3043, 110.

R. Spindler et al.. Synthests NMR Characterization, and Electrical Properties of SiIoxane-Based Polymer Electrolytes, Macromolecules, 1988, 648-654, 21.

S. Ganapathiappan at al., Synthesis, Characterization and Electrical Response of Phosphazene Polyelectrolytes, Journal of America Chemical Society, 1989, 4091-4095, 111.

M. Ouchi et al., Convenient and Efficient Tosylatron of Oligoethylene Glycols and the Related Alcohols in Tetrahydrofuren-Water in the Presence of Sodium Hydroxide, The Chemical Sodety of Japan, 1990,1260-1262, 63,4.

L. Dominey et al., Thermally Stable Lithium Salts for Polymer Electrolytes, Electrochimica Acta, 1992. 1551-1654. 37(9).

F. Alloin at al., Triblock Copolymers and Networks Incorporating 0ligo (Oxyethylene) Chains, Solid Slate Ionics, 1993, 3-9, 60.

C. St. Pierre at al., Lithium-Metal-Polymer Battery for Electric Vehicle and Hybrid Electric Vehicle Applications, www.aveslor.com/en/automotive.html, info@aveslor.com, 1993, 11 pages.

G. Zhou at al., Solvent-Free Cation-Conduction Polysiloxane Electrolytes with Pendant Olige(oxyethylene) and Sulfonate Groups, Macromolecules, 1993, 2202-2208, 26.

M. Gauthier et al., Large Lithium Polymer Battery Development The Immobile Solvent Concept, Journal of Power Sources, 1995, 163-169, 54.

H. Allcock at al., Polyphosphazenes Bearing Branched and Linear Oligoethyleneoxy Skie Groups as Solid Solvents for Ionic Conduction, Macromolecules, 1996, 7544-7552, 29.

K. Abraham at al., Highly Conductive PEO-Like Polymer Electrolytes, Journal of Chemical Materials, 1997, 1978-1988, 9(9).

M. Furlani et al., Time Resolved Luminescence and Vibrational Spectroscopic Studies on Complexes of Poly(Ethylene Oxide)

Oligomers and Eu(TFSI)₉ Salt, 11th International Conference on Solid State Ionics, 1997, 10 pages.

J. Gnanaraj at al., Studies on Comb-like Polymer Blend with Poly(Ethylene Oxide)—Lithium Perchlorate Salt Complex Electrolyte. Polymer, 1997, 3709-3712, 38(14).

F. Gray, Polymer Electrolytes, RSC Materials Monographs, UK, 1997, 48-49.

C. Letourneau at al., Progress in Lithium-Metal-Polymer Battery System for Electric Vehicles, http://www.avestor.com/iactivefiles/eve15.pdf, Info@avestor.com, INTELEC, Oct. 1998, Canada, 1-10.

J. Blackwell et al. B(C₄F₆)-Catalyzed Sllation of Alcohols: A Mild, General Method for Synthesis for Silyl Ethers, Journal of Organic Chemistry, 1999, 4887-4892, 64.

R. Hooper et al., A Highly Conductive Solid-State Polymer Electrolyte Based on a Double-Comb Polysiloxene Polymer with Oligo(Ethylene Oxide) Side Chains, Organometallics, American Chemical Society, 1999, 3249-3251, 18(17).

Z. Wang et al., Thermal, Electrochemical, and Spectroscopic Characterizations of Huperbranched Polymer Electrolyte, Journal of Electrochemical Society, 1999, 2209-2215,146(6).

M. Anderman at al., Advanced Batteries for Electric Vehicles: An Assessment of Performance, Cost, and Availability, Prepared for State of California Air Resources Board by The Year 2000 Battery Technology Advisory Panel, 2000, i-ix and 60-65.

A. Reiche et al., Gel Electrolytes on the Basis of Oligo(Ethylene Glycol), Dimethacrylates—Thermal, Mechanical and Electrochemical Properties in Relationship to the Network Structure, Polymer, 2000, 3821-3838, 41.

R. Hooper et al., Highly Conductive Siloxane Polymers, Macromolecules, 2001, 931-936, 34.

X. Hou et al., Novel Interpenetrating Polymer Network Electrolytes, Polymer, 2001, 4161-4188, 42.

C.F. Rome, The Unique Properties of Silicone at the Service of the Petroleum Industry, Hydrocarbon Asia, 2001, 42-49, 'www.hcasia.safan.com/mag/may-Jun01/Tech-Silicone.pdf '.

W. Xu et al., LIBOB and Its Derivatives Weakly Coordinating Anions, and the Exceptional Conductivity of Their Nonaqueous Solutions, Electrochemical and Solld-State Letters, 2001, E1-E4, 4(1).

W. Xu et al., Ionic Conductivity and Electrochemical Properties of Lithium Orthoborate Salts, http://www.electrochem.org/meetings/past/200/abstracts/symposia/bia/0107.pdf, United States, Sep. 5, 2001.

N. Katayama et al., Thermal Stability of Propylene Carbonate and Ethylene Carbonate-Propylene Carbonate-Based Electrolytes for Use in Li Cells, Journal of Power Sources, 2002, 1-6, 4769, http://www.sciencedirect.com/web-editions.

K. Xu et al., LIBOB as Salt for Lithium-Ion Batteries, Electrochemical and Solid State Letters. 2002, pp. A26-A29, vol. 5(1).

J. Alper, The Battery: Not Yet a Terminal Case, Science, May 2002, 1224-1226, vol. 298, www.sciencernag.org.

Y. Kang et al., Solid Polymer Electrolytes based on Cross-linked Slioxane-g-oligoethylene oxide: Ionic conductivity and Electrochemical Properties, Abstract book of 11th International Meeting on Lithium Batteries (IMLB 11), Jun. 23-28, 2002.

B. Oh et al., New Interpenetrating Electrolyte Network-Type Siloxane Polymer Electrolyte. Electrochemical and Solid State Letters, 2002, E59-E61, 5(11), The Electrochemical Society, Inc., Sep. 11, 2002.

T. Fujii et al., Application of LIBOB as an Electrolyte Salt for 4 V Class Lithium Ion Rechargeable Cells, whttp://www2.electrochem.org/cgi-bin/abs?mtg=202&abs=0203, Oct. 24, 2002, Untied States.

W. Xu et al., Structures of Orthoharate Anions and Physical Properties of Their Lithium Salt Nonaqueous Solutions, Journal of the Electrochemical Society, 2003, 1-0. 150(1).

International Search Report, dated May 1, 2003, received in relation to Application No. PCT/US03/02127.

Y. Kang at al., Solid Polymer Electrolytes Based on Cross-Linked Polyslioxane-g-ollgo(ethylene oxide): Ionic Conductivity and Electrochemical Properties, *Journal of Power Sources* 119-121 (Jun. 1, 2003), pp. 448-453.

International Search Report, dated Jul. 11, 2003, received in relation to Application No. PCT/US03/02128.

International Search Report, dated Jul. 11, 2003, received in relation to Application No. PCT/US03/08740.

International Search Report dated Sep. 12, 2003, received in relation to Application No. PCT/US03/08784.

International Search Report, dated Oct. 9, 2003, received in relation to Application No. PCT/US03/08779.

International Search Report, dated Oct. 9, 2003, received in relation to Application No. PCT/US03/08763.

Z. Zhang et al., Cross-Linked Network Polymer Electrolytes Based on a Polysiloxane Backbone with Oligo(oxyethylene) Side Chains: Synthesis and Conductivity, Macromolecules, Oct. 28, 2003, vol. 36, No. 24, 9176-9180.

Nicodom Ltd., Inorganic Library of FT-IR Spectra Inorganics II—Boron Compounds, homepage, website http://www.ftir.cz/INLIB2.html and http://www.ftir.cz./home_page_of_nicodorn_sro.htm.

* cited by examiner

BATTERY INCLUDING ELECTROLYTE WITH MIXED SOLVENT

REFERENCE TO RELATED APPLICATIONS

This application is a continuation-in-part of U.S. patent application Ser. No. 10/971,912, filed Oct. 21, 2004, and entitled "Battery Having Electrolyte Including Organoborate Salt," and now issued as U.S. Pat. No. 7,718,321; and this application is a continuation-in-part of U.S. patent application Ser. No. 11/053,338, filed on Feb. 8, 2005, and entitled "Reduction of Impurities in Battery Electrolyte," and now issued as U.S. Pat. No. 7,771,496; and this applications is a continuation-in-part of U.S. patent application Ser. No. 11/056,869, filed on Feb. 10, 2005, now U.S. Pat. No. 8,076,032 and entitled "Electrolyte Including Silane for use in Electrochemical Devices;" which is a continuation-in-part of U.S. patent application Ser. No. 10/971,926, filed on Oct. 21, 2004, entitled "Electrochemical Device Having Electrolyte Including Tetrasiloxane," and now abandoned; and which is also a continuation-in-part of U.S. patent application Ser. No. 10/971,913, filed on Oct. 21, 2004, entitled "Electrochemical Device Having Electrolyte Including Trisiloxane," and now abandoned; and which is also a continuation-in-part of U.S. patent application Ser. No. 10/971,507, filed on Oct. 21, 2004, entitled "Electrochemical Device Having Electrolyte Including Disiloxane," and now abandoned; and this application is a continuation-in-part of U.S. patent application Ser. No. 10/977,313, filed on Oct. 28, 2004, entitled "Electrolyte Including Silane for use in Electrochemical Devices," and now abandoned; which claims priority to U.S. Patent Application Ser. No. 60/601,452, filed on Aug. 13, 2004, and entitled "Electrolyte Including Silane for use in Electrochemical Devices;" and this application is a continuation-in-part of U.S. patent application Ser. No. 10/962,125, filed on Oct. 7, 2004, and entitled "Battery Having Electrolyte Including One or More Additives," and now abandoned; which is a continuation-in-part of U.S. Provisional patent application Ser. No. 10/810,019, filed on Mar. 25, 2004, and entitled "Polysiloxane for Use in Electrochemical Cells," and now abandoned; and which is also a continuation-in-part of U.S. patent application Ser. No. 10/810,080, filed on Mar. 25, 2004, entitled "Electrolyte Use in Electrochemical Devices," and now issued as U.S. Pat. No. 7,588,859; which claims the benefit of U.S. Provisional Patent Application Ser. No. 60/543,951, filed on Feb. 11, 2004, and entitled "Siloxanes;" each of which is incorporated herein in its entirety.

STATEMENT REGARDING FEDERALLY SPONSORED RESEARCH OR DEVELOPMENT

This invention was made with United States Government support under contract DAAB07-03-C-B411 awarded by the U.S. Army Communications-Electronic Research & Engineering Center. The United States Government has certain rights in this invention.

FIELD

The present invention relates to electrochemical devices, and more particularly to battery electrolytes.

BACKGROUND

The increased demand for lithium batteries has resulted in research and development to improve the safety and performance of these batteries. The organic carbonate solvents employed in the electrolytes of many batteries are associated with high degrees of volatility, flammability, and chemical reactivity. A variety of electrolytes that include siloxane solvents have been developed to address these issues. However, siloxane based electrolytes are often associated with low levels of conductivity that limit their application to low rate applications. As a result, there is a need for a battery that can take advantage of the safety provided by a siloxane solvent.

SUMMARY

A battery is disclosed. The battery includes an electrolyte activating one or more anodes and one or more cathodes. The electrolyte includes one or more salts dissolved in a solvent. The solvent includes one or more first siloxanes and/or one or more first silanes. Each of the first siloxanes and/or first silanes have one or more first substituents that each include a poly(alkylene oxide) moiety. The solvent also includes one or more second siloxanes and/or one or more second silanes. Each of the second siloxanes and/or second silanes has one or more second substituents that each include a carbonate moiety. In some instances, the carbonate moiety is a cyclic carbonate moiety. One or more of the first siloxanes and/or first silanes can include a cyclic carbonate moiety. Alternately, each of the first siloxanes and/or first silanes can exclude a cyclic carbonate moiety.

One or more of the first substituents can be a noncrosslinking side-chain. Additionally or alternately, one or more of the first substituents can be a crosslinking side-chain. In some instances, one or more of the second substituents is a noncrosslinking side-chain.

In some instances, the solvent includes a first silane or second silane. Alternately, the solvent can include or consists of a first silane and a second silane. In one example, the solvent includes or consists of a first siloxane that is a disiloxanes and/or a second siloxane that is a disiloxane.

In another example, the solvent includes or consists of a first siloxane that is a trisiloxanes and/or a second siloxane that is a trisiloxane. In yet another example, the solvent includes or consists of a first siloxane that is a tetrasiloxanes and/or a second siloxane that is a tetrasiloxane.

In some instances, the solvent includes one or more organic solvents. In some instances, the one or more organic solvents include a cyclic carbonate or a combination of a linear carbonate and cyclic carbonate. In some instances, the organic solvent excludes silicon atom(s). Other examples of suitable organic solvents include, but are not limited to: cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate; aliphatic carboxylate esters such as methyl formate, methyl acetate and ethyl propionate; gamma-lactones such as gamma-butyrolactone; linear ethers such as 1,2-ethoxyethane (DEE) and ethoxymethoxyethane (EME); cyclic ethers such as tetrahydrofuran and 2-methyltetrahydrofuran; and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone; and fluorinated carboxylate esters. One example of the solvent includes one or more second siloxanes and/or one more second silanes, and one or more organic solvents, and excludes first silanes and/or first siloxanes.

In some instances, the one or more salts include one or more organoborate salts. The one or more organoborate salts can include a dihalo mono[bidentate] borate such as include lithium difluoro oxalatoborate (LiDfOB) and/or a bis[bidentate] boratesuch as lithium bis-oxalato borate (LiBOB).

In some instances, one or more of the anodes include or consist of lithium metal, lithium metal alloy and/or lithium metal intermetallic compound.

DESCRIPTION

Figure 1:
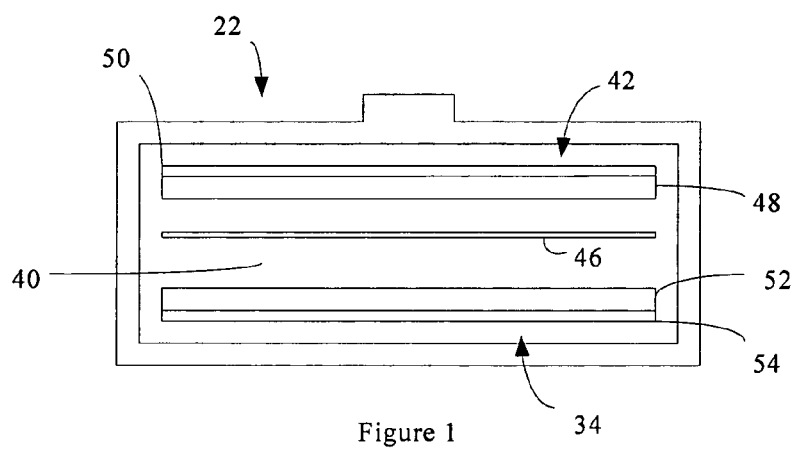
FIG. 1 is a schematic view of a battery.

Batteries are disclosed. The batteries include an electrolyte activating one or more anodes and one or more cathodes. The electrolyte includes one or more salts dissolved in a solvent. The solvent includes one or more first siloxanes and/or one or more first silanes. Each of the first siloxanes and the first silanes have one or more first substituents that include a poly(alkylene oxide) moiety. The poly(alkylene oxide) moieties can enhance the ionic conductivity of the electrolyte by lowering the viscosity of the electrolyte. The solvent also includes one or more second siloxanes and/or one or more second silanes. The second siloxanes and the second silanes each have one or more second substituents that include a cyclic carbonate moiety. The cyclic carbonate moieties can increase the ionic conductivity of the electrolyte by allowing the electrolyte to dissolve more salt by providing the electrolyte with an increase in dielectric constant and/or donor number. The inventors have found that the combination of the first siloxane and/or first silane combined with the second siloxane and/or silane provide an electrolyte capable of higher rate performance with enhanced cycling performance and safety.

The first siloxanes and/or second siloxanes can be polysiloxanes, oligosiloxanes, and/or tetrasiloxanes but preferably includes or consists of trisiloxanes and/or disiloxanes. Trisiloxanes or disiloxanes can yield an electrolyte with a lower viscosity than electrolytes that include similarly structured polysiloxanes. The reduced viscosity can increase the conductivity of the electrolyte and can improve wetting of electrodes in an electrochemical device enough to enhance the homogeneity of the electrolyte distribution in the cell. The enhanced homogeneity can be sufficient to increase the capacity and cycling properties of batteries.

The solvent can also include or consist of silanes. Silanes can have a viscosity that is reduced relative to similarly structured polysiloxanes, tetrasiloxanes, trisiloxanes or disiloxanes. The additional reduction in viscosity can further increase the conductivity of the electrolyte and improve wetting of electrodes in an electrochemical device enough to further increase the capacity and cycling properties of batteries.

One or more first siloxane and/or one or more first silanes can include a carbonate moiety or a cyclic carbonate moiety in addition to the poly(alkylene) oxide moiety. However, the combination of the carbonate moiety and poly(alkylene) oxide moiety can increase the viscosity of the electrolyte. As a result, at least one of the first siloxanes in the solvent can exclude a cyclic carbonate moiety or exclude a carbonate moiety. In some instances, at least one of the first silanes in the solvent exclude a cyclic carbonate moiety or exclude a carbonate moiety. In some instances, at least one of the second siloxanes in the solvent exclude a poly(alkylene oxide) moiety. In some instances, at least one of the second silanes in the solvents exclude a poly(alkylene oxide) moiety. Further, each of the first siloxanes in the solvent can exclude a cyclic carbonate moiety or exclude a carbonate moiety. In some instances, each of the first silanes in the solvent exclude a cyclic carbonate moiety or exclude a carbonate moiety. In some instances, each of the second siloxanes in the solvent exclude a poly(alkylene oxide) moiety. In some instances, each of the second silanes in the solvents exclude a poly (alkylene oxide) moiety.

One or more of the first substituents can be a noncrosslinking side-chain. Additionally or alternately, one or more of the first substituents can be a crosslinking side-chain. In some instances, one or more of the second substituents is a non-crosslinking side-chain. In some instances, an oxygen included in the poly(alkylene oxide) moiety of a first substituent is linked directly to a silicon in a first silane or in a first siloxane. Alternately, an organic spacer can link a poly(alkylene oxide) moiety to a silicon in a first silane or in a first siloxane. An organic spacer can provide a trade-off between ionic conductivity and stability. In some instances, the cyclic moiety in a first substituent is linked directly to a silicon in a first silane or in a first siloxane. Alternately, an oxygen or an organic spacer can link the cyclic carbonate moiety to a silicon in a first silane or in a first siloxane.

A suitable ratio of (mass of the first siloxane and/or first silane):(mass of the second siloxane and/or second silane) in the solvent includes ratios greater than 0.5:1, (⅔): 1 or 1:1 and/or less than 15:1, 9:1 or 4:1. It is believed that the ionic conductivity of the electrolyte is higher than the ionic conductivity of an electrolyte having only the first siloxane and/or the first silane when the ratio is greater than (⅔):1. Accordingly, the ratio is preferably greater than 4:6. A preferred range for the ratio is between 9:1 and 0.5:1.

Another embodiment of the solvent includes one or more organic solvents in addition to the first siloxane and/or first silane and the second siloxane and/Or second silane. In some instances, the organic solvent further reduces the viscosity of the electrolyte and further enhances the high rate performance of the electrolyte. Additionally, the inventors have found that the safety provided by the siloxane or silane can be largely retained by the solvent despite the addition of the organic solvent. Without being bound to theory, the safety retention is believed to result from the siloxanes or silanes forming a more stable passivation layer on the battery electrodes than is formed by organic solvents. The enhanced stability of the passivation layer is believed to reduce or prevent shorts that are normally the source of safety issues when organic solvents are employed. The combination of enhanced performance plus safety level retention is believed to occur when the total mass ratio of organic solvent: (the total mass of the one or more first siloxane, one or more first silanes, one or more second siloxanes and one or more second silanes) is greater than 0.1:1, 0.5:1, (⅔):1 or 1:1 and/or less than 9:1, 4:1, 2:1 or 1:1.

As noted above, one or more of the first siloxanes and/or one or more of the second siloxanes can be a polysiloxane having a backbone with five or more silicons. A polysiloxane serves as a first siloxane when one or more silicons in the backbone are linked to a first substituent and one or more silicons are linked to a second substituent. Alternately, a polysiloxane serves as a first siloxane when one or more silicons in the backbone are linked to a first substituent and the polysiloxane excludes second substituents. A polysiloxane serves as a second siloxane when one or more silicons in the backbone are linked to a second substituent and the polysiloxane excludes first substituents. The first substituents each include a poly(alkylene oxide) moiety and the second substituents each includes a cyclic carbonate moiety.

Suitable first substituents for a polysiloxane include noncrosslinked side-chains or crosslinks to other polysiloxanes. The first substituents on a single polysiloxane chain can be the same or different. In one example of the polysiloxane, each of the first substituents is a noncrosslinked side-chain. Suitable second substituents include noncrosslinked side-chains. The second substituents on a single polysiloxane can be the same or different. In some instances, the terminal silicons in the backbone of a polysiloxane are not linked to either a first substituent or a second substituent. Each of the non-terminal silicons can be linked to at least one first substituent or to at least one second substituent. Examples of suitable polysiloxanes are disclosed in U.S. patent application Ser. No. 10/810,019, filed on Mar. 25, 2004, entitled "Polysiloxane for Use in Electrochemical Cells," and incorporated herein in its entirety.

An examples of suitable polysiloxanes have a structure according to General Formula

II

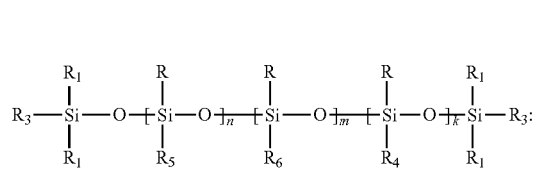

where R is alkyl or aryl; $R_1$ is alkyl or aryl; $R_3$ is alkyl aryl or represented by:

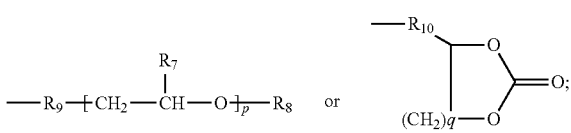

$R_4$ is a crosslink that links the polysiloxane backbone to another polysiloxane backbone; $R_5$ is represented by:

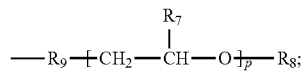

$R_6$ is represented by:

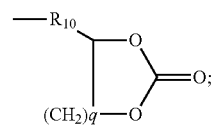

$R_7$ is hydrogen; alkyl or aryl; $R_8$ is alkyl or aryl; $R_9$ is oxygen or an organic spacer; $R_{10}$ is an oxygen or an organic spacer; k is 0 or greater than 0; p is 3, greater than 3 and/or less than 20; q is 1 to 2; m is 0 or greater than 0 and n is 0 or greater than 0 and can be 2 to 25. In some instances, n+m+k is 3 or greater than 3. In some instances, m is greater than 0 and a ratio of n:m is 1:1 to 100:1 and is more preferably 5:1 to 100:1. One or more of the alkyl and/or aryl groups can be substituted, unsubstituted, halogenated, and/or fluorinated. A suitable organic spacer can include one or more —$CH_2$— groups. Other suitable spacers can include an alkylene, alkylene oxide, or bivalent ether moiety. These spacers can be substituted or unsubstituted. The above spacers can be completely or partially halogenated. For instance, the above spacers can be completely or partially fluorinated. In one example, $R_9$ is represented by: —O—$(CH_2)_3$—O— or —$(CH_2)_3$—O— with the oxygen linked to the polyethylene oxide moiety. In another example, $R_{10}$ is represented by: —$CH_2$—O—$(CH_2)_3$— where the single —$CH_2$— group is positioned between the carbonate and the oxygen or —$CH_2$—O—.

In instances, where a polysiloxane according to Formula II includes one or more crosslinks, a suitable ratio for (number of crosslinks):(m+n) includes, but is not limited to, a ratio in a range of 1:4 to 1:200, in a range of 1:6 to 1:100, or in a range of 1:6 to 1:70.

Each of the $R_3$ can be the same or different. In some instances, one of the $R_3$ includes a poly(alkylene oxide) moiety and another $R_3$ includes a cyclic carbonate moiety. The structures of $R_3$ can be the same as the structure of $R_5$. In some instances, the $R_3$ structures are different from the $R_5$ structures. When m is greater than 0, the structures of $R_3$ can be the same as the structure of $R_6$. In some instances, the $R_3$ structures are different from the structure of $R_6$. In some instances, m is 0 and $R_3$ and $R_5$ each have a structure according to:

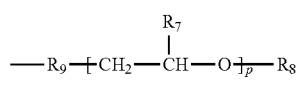

and the structures for $R_3$ are different from the structure for $R_5$ or the same as the structure for $R_5$.

When a polysiloxane according to General Formula II is to be employed in an electrolyte, a suitable average molecular weight for the polysiloxane includes, but is not limited to, an average molecular weight less than or equal to 3000 g/mole. Polysiloxanes according to Formula II can serve as first siloxane or as a second siloxane depending on the selection of variables.

One or more of the first siloxanes and/or one or more of the second siloxanes can be a tetrasiloxane. A suitable tetrasiloxane has a backbone with two central silicons and two terminal silicons. A tetrasiloxane serves as a first siloxane when one or more silicons in the backbone are linked to a first substituent and one or more silicons are linked to a second substituent. Alternately, a tetrasiloxane serves as a first siloxane when one or more silicons in the backbone are linked to a first substituent and the tetrasiloxane excludes second substituents. A tetrasiloxane serves as a second siloxane when one or more silicons in the backbone are linked to a second substituent and the trisiloxane excludes first substituents. The first substituent includes a poly(alkylene oxide) moiety and the second substituent includes a cyclic carbonate moiety.

Suitable first substituents include noncrosslinked side-chains or crosslinks to other tetrasiloxanes. Further, each of the first substituents on a tetrasiloxane can be the same or different. In one example of the tetrasiloxane, each of the first substituents is a noncrosslinked side-chain. Suitable second substituents include noncrosslinked side-chains. Further, each of the second substituents on a tetrasiloxane can be the same or different. Each of the second substituents can be the same or different. In some instances, the terminal silicons in the backbone are not linked to either a first substituent or a second substituent. Each of the central silicons can be linked to at least one first substituent or to at least one second substituent. One or more of the silicons in the backbone of the tetrasiloxane can be linked to a cross-link to another tetrasiloxane. The cross-link can include a poly(alkylene oxide) moiety. Examples of suitable tetrasiloxane and tetrasiloxane electrolytes are disclosed in U.S. Provisional Patent Application Ser. No. 60/543,951, filed on Feb. 11, 2004, entitled "Siloxanes;" and in U.S. patent application Ser. No. 10/971,926, filed on Oct. 21, 2004, and entitled "Electrochemical Device Having Electrolyte Including Tetrasiloxane;" and in U.S. patent application Ser. No. 11/056,868, filed on Feb. 10, 2005, and entitled "Electrochemical Device Having Electrolyte Including Tetrasiloxane;" each of which is incorporated herein in its entirety.

side-chains that each exclude a poly(alkylene oxide) moiety and/or that each exclude a cyclic carbonate moiety. In some instances, the entities linked to the backbone of the tetrasiloxane other than the first noncrosslinked side-chain and the second noncrosslinked side-chain each exclude a poly(alkylene oxide) moiety and/or a cyclic carbonate moiety. For instance, the entities linked to the backbone of the tetrasiloxane other than the first noncrosslinked side-chain and the second noncrosslinked side-chain can each be a substituent such as a noncrosslinked side-chain and each of these substituents can exclude a poly(alkylene oxide) moiety and/or a cyclic carbonate moiety.

A silicon on the tetrasiloxane backbone can be linked directly to a poly(alkylene oxide) moiety or a spacer can be positioned between the poly(alkylene oxide) moiety and the silicon. The spacer can be an organic spacer. When the first silicon and the second silicon are each central silicons linked directly to a noncrosslinked side-chain that includes a poly(alkylene oxide) moiety, the poly(alkylene oxide) moieties each include an oxygen linked directly to the backbone. The poly(alkylene oxide) moiety can be an oligo(alkylene oxide) moiety. In some instances, the poly(alkylene oxide) moiety is a poly(ethylene oxide) moiety.

When a silicon is linked to noncrosslinked side-chains that includes a cyclic carbonate moiety, the noncrosslinked side-chain can include a spacer that links the carbonate moiety to the silicon or an oxygen can link the cyclic carbonate moiety to the silicon. The spacer can be an organic spacer.

In instances where the first silicon and the second silicons are each terminal silicons, the first and second silicons can each be linked to a noncrosslinked side-chain that includes a poly(alkylene oxide) moiety. Formula III provides an example of a tetrasiloxane suitable for use as a first siloxane where the first silicon and the second silicon are each terminal silicons linked to a noncrosslinked side-chain that includes a polyethylene oxide moiety. Formula III:

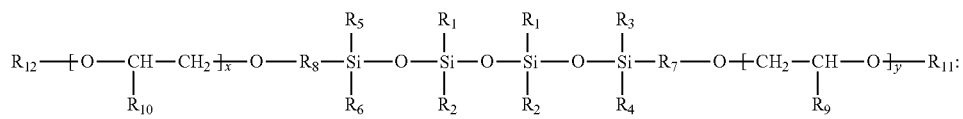

An example of a tetrasiloxane for use as a first siloxane includes a backbone with a first silicon linked to a first noncrosslinked side-chain that includes a poly(alkylene oxide) moiety. Additionally, a second silicon in the backbone is linked to a second noncrosslinked side-chain that includes a poly(alkylene oxide) moiety or a cyclic carbonate moiety. In some instances, the first silicon and the second silicon are each terminal silicons. In other instances, the first silicon and the second silicon are each central silicons.

As the number of substituents that include a poly(alkylene oxide) moiety and/or a cyclic carbonate moiety increases, the viscosity of an electrolyte can increase undesirably and/or the ionic conductivity of an electrolyte can decrease undesirably. As a result, in some instances, the tetrasiloxane includes no more than two poly(alkylene oxide) moieties or no more than one poly(alkylene oxide) moiety. Additionally or alternatively, the tetrasiloxane can include no more than two carbonate moieties or no more than one carbonate moiety. For instance, a third one of the silicons and a fourth one of the silicons can each be linked to entities that each exclude a poly(alkylene oxide) moiety and/or that each exclude a cyclic carbonate moiety. For instance, the third silicon and the fourth silicon can each be linked to substituents such as noncrosslinked wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is nil or a spacer; $R_8$ is nil or a spacer; $R_9$ is a hydrogen, an alkyl group or an aryl group; $R_{10}$ is a hydrogen, an alkyl group or an aryl group; $R_{11}$ is an alkyl group or an aryl group; and $R_{12}$ is an alkyl group or an aryl group; x is 1 or greater and/or 12 or less and y is 1 or greater and/or 12 or less. One or more of the alkyl and/or aryl groups can be substituted, unsubstituted, halogenated, and/or fluorinated. The spacers can be organic spacers and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_7$ and $R_8$ are each nil or are each a spacer. In one example, $R_7$ and/or $R_8$ is represented by: —$(CH_2)_3$—. In one example: $R_1$; $R_2$; $R_3$; $R_4$; $R_5$; $R_6$; $R_{11}$; and $R_{12}$ are each methyl groups.

Examples of preferred tetrasiloxanes according to Formula III are represented by Formula III-A through Formula III-B. Formula III-A illustrates an example of a tetrasiloxane having terminal silicons linked to noncrosslinked side-chains that include an organic spacer linking a poly(alkylene oxide) moiety to a terminal silicon. Formula III-B illustrates an example of a tetrasiloxane having terminal silicons that are each linked to an oxygen included in a poly(alkylene oxide) moiety.

Formula III-A:

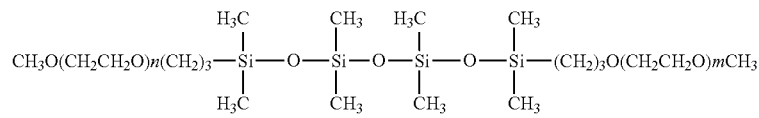

wherein n is 1 to 12 and m is 1 to 12.

Formula III-B:

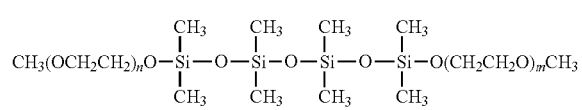

wherein n is 1 to 12 and m is 1 to 12.

Another example of a tetrasiloxane suitable for use as a first siloxane has a backbone with one of two central silicons linked to a noncrosslinked side-chain that includes a poly(alkylene oxide) moiety and the other central silicon linked to a noncrosslinked side-chain that includes a poly(alkylene oxide) moiety or a carbonate moiety. When each of the central silicons is linked to a noncrosslinked side-chain that includes a poly(alkylene oxide) moiety, the poly(alkylene oxide) moieties each include an oxygen linked directly to a silicon in the backbone.

Another example of a tetrasiloxane suitable for use as a first siloxane is represented by Formula IV. Formula IV:

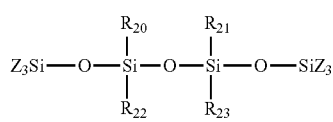

wherein: $R_{20}$ is an alkyl group or an aryl group; $R_{21}$ is an alkyl group or an aryl group; $R_{22}$ is represented by Formula IV-A; $R_{23}$ is represented by Formula IV-B or IV-C and each Z is an alkyl or an aryl group. The Zs can be the same or can be different.

Formula IV-A:

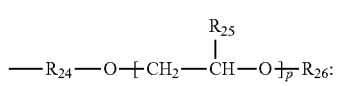

wherein $R_{24}$ is an organic spacer or nil; $R_{25}$ is hydrogen, alkyl or aryl; $R_{26}$ is alkyl or aryl and p is 1 or more and/or 12 or less. The organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{24}$ is represented by: —$(CH_2)_3$—.

Formula IV-B:

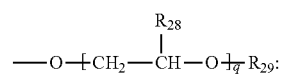

wherein $R_{28}$ is hydrogen, alkyl or aryl; $R_{29}$ is alkyl or aryl; q is 1 or more and/or 12 or less.

Formula IV-C:

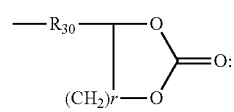

wherein $R_{30}$ is an organic spacer and r is 1 or 2. Suitable organic spacers for Formula IV through IV-C can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{30}$ is a bivalent ether moiety represented by: —$CH_2$—O—$(CH_2)_3$— with the —$(CH_2)_3$— linked to a silicon on the backbone of the tetrasiloxane. In another example, $R_{30}$ is an alkylene oxide moiety represented by: —$CH_2$—O— with the oxygen linked to a silicon on the backbone of the tetrasiloxane.

One or more of the alkyl and aryl groups specified in Formula IV through Formula IV-C can be substituted, unsubstituted, halogenated, and/or fluorinated. When $R_{23}$ is according to Formula IV-B, $R_{24}$ can be nil or can be a spacer. In one example, $R_{23}$ is according to Formula IV-C and $R_{30}$ is represented by: —$CH_2$—O—$(CH_2)_3$— where the single —$CH_2$— group is positioned between the carbonate and the oxygen. In an example, the Zs, $R_{20}$, $R_{21}$, $R_{26}$, and $R_{29}$ are each a methyl group. In another example, $R_{22}$ is represented by Formula IV-A and $R_{23}$ is represented by Formula IV-B and in another example $R_{23}$ is represented by Formula IV-A and $R_{23}$ is represented by Formula IV-C.

Examples of tetrasiloxanes according to Formula IV are represented by Formula IV-D through Formula IV-F. Formula IV-D represents a tetrasiloxane where each of the central silicons is linked to a noncrosslinked side-chain that includes a poly(ethylene oxide) moiety. The central silicons are each linked directly to an oxygen included in a poly(ethylene oxide) moiety. Formula IV-E and Formula IV-F each represent an example of a tetrasiloxane wherein a central silicon is linked to a noncrosslinked side-chain that includes a poly(alkylene oxide) moiety and another central silicon is linked to a noncrosslinked side-chain that includes a carbonate moiety. In Formula IV-E, an organic spacer is positioned between the poly(alkylene oxide) moiety and the silicon. In Formula IV-F, a silicon is linked directly to an oxygen included in a poly(alkylene oxide) moiety.

Formula IV-D:

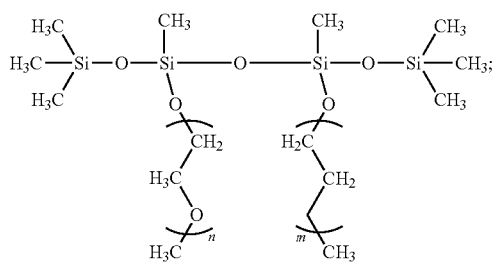

wherein n is 1 to 12.

Formula IV-E:

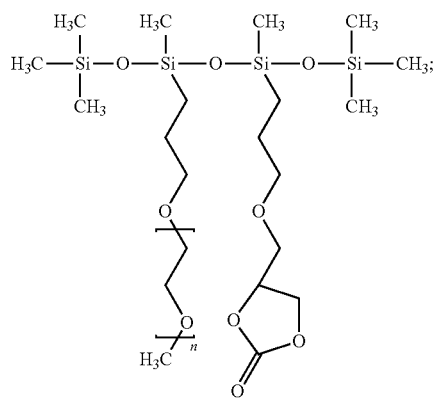

wherein n is 1 to 12.

Formula IV-F:

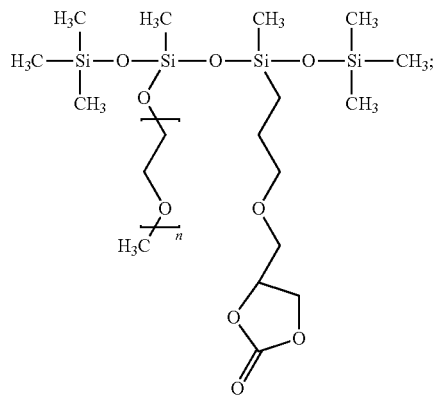

wherein n is 1 to 12.

One or more of the first siloxanes and/or one or more of the second siloxanes can be a trisiloxane. A suitable trisiloxane has a backbone with three silicons. A trisiloxane serves as a first siloxane when one or more silicons in the backbone are linked to a first substituent and one or more silicons are linked to a second substituent. Alternately, a trisiloxane serves as a first siloxane when one or more silicons in the backbone are linked to a first substituent and the trisiloxane excludes second substituents. A trisiloxane serves as a second siloxane when one or more silicons in the backbone are linked to a second substituent and the trisiloxane exclude first substituents. The first substituent includes a poly(alkylene oxide) moiety and the second substituent includes a cyclic carbonate moiety.

Suitable first substituents include noncrosslinked side-chains or crosslinks to other trisiloxanes. When the trisiloxanes includes more than one first substituent, each of the first substituents can be the same or different. In one example of the trisiloxane, each of the first substituents is a non-crosslinked side-chain. Suitable second substituents include noncrosslinked side-chains. When the trisiloxane includes more than one second substituent, each of the second substituents can be the same or different. In some instances, the terminal silicons in the backbone are not linked to either a first substituent or a second substituent. The central silicons can be linked to at least one first substituent or to at least one second substituent. Examples of suitable trisiloxanes and trisiloxane electrolytes are disclosed in U.S. Provisional Patent Application Ser. No. 60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices;" and in U.S. patent application Ser. No. 10/971,913, filed on Oct. 21, 2004, and entitled "Electrochemical Device Having Electrolyte Including Trisiloxane;" and in U.S. patent application Ser. No. 11/056,867, filed on Feb. 10, 2005, and entitled "Electrochemical Device Having Electrolyte Including Trisiloxane;" each of which is incorporated herein in its entirety.

A suitable trisiloxane includes a backbone with a first terminal silicon, a central silicon and a second terminal silicon. The first terminal silicon is linked to a first noncrosslinked side-chain that includes a poly(alkylene oxide) moiety or that includes a cyclic carbonate moiety. The second terminal silicon is linked to a second noncrosslinked side-chain that includes a poly(alkylene oxide) moiety or that includes a cyclic carbonate moiety. The first noncrosslinked side-chain and the second noncrosslinked side-chain can each include a poly(alkylene oxide) moiety or can each include a cyclic carbonate moiety. Alternately, the first side can include a poly(alkylene oxide) moiety and the second noncrosslinked side-chain can include a cyclic carbonate moiety. In one example, the second noncrosslinked side-chain includes a cyclic carbonate moiety and the first noncrosslinked side-chain includes an organic spacer linking a poly(alkylene oxide) moiety to the first terminal silicon.

As the number of substituents that include a poly(alkylene oxide) moiety and/or a cyclic carbonate moiety increase, the viscosity of an electrolyte can increase undesirably and/or the ionic conductivity of an electrolyte can decrease undesirably. As a result, the trisiloxane can include no more than two poly(alkylene oxide) moieties or no more than one poly(alkylene oxide) moiety. Additionally or alternately, the trisiloxane can include no more than two carbonate moieties or no more than one carbonate moiety. For instance, each of the entities linked to the central silicon can exclude a poly(alkylene oxide) moiety and/or a cyclic carbonate moiety. Additionally or alternately, the entities linked to the first terminal silicon other than the first noncrosslinked side-chain and the entities linked to the second terminal silicon other than the second noncrosslinked side-chain can each exclude a poly(alkylene oxide) moiety and/or a cyclic carbonate moiety. In one example, each of the entities linked to the silicons in the backbone of the trisiloxane other than the first noncrosslinked side-chain and other than the second noncrosslinked side-chain exclude both a poly(alkylene oxide) moiety and a cyclic carbonate moiety. Examples of entities that may be linked to the silicons include, but are not limited to, substituents such as noncrosslinked side-chains, cross-links and halogens.

Formula V provides an example of the trisiloxane. Formula V:

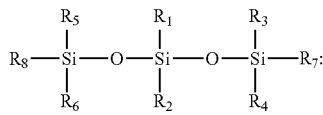

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D.

Formula V-A:

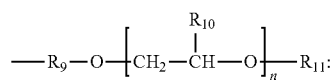

wherein $R_9$ is nil or a spacer; $R_{10}$ is hydrogen; alkyl or aryl; $R_{11}$ is alkyl or aryl; and n is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_9$ is represented by: —$(CH_2)_3$—.

Formula V-B:

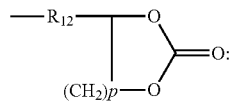

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the trisiloxane. In another example, $R_{12}$ is a alkylene oxide moiety represented by: —$CH_2$—O— with the oxygen linked to a silicon on the backbone of the trisiloxane.

Formula V-C:

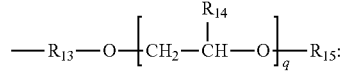

wherein $R_{13}$ is nil or a spacer; $R_{14}$ is hydrogen; alkyl or aryl; $R_{15}$ is alkyl or aryl; and q is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{13}$ is represented by: —$(CH_2)_3$—.

Formula V-D:

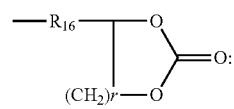

wherein $R_{16}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{16}$ is a bivalent ether moiety represented by: —$CH_2$—O—$(CH_2)_3$— with the —$(CH_2)_3$— linked to a silicon on the backbone of the trisiloxane. In another example, $R_{16}$ is a alkylene oxide moiety represented by: —$CH_2$—O— with the oxygen linked to a silicon on the backbone of the trisiloxane.

One or more of the alkyl and aryl groups specified in Formula V through Formula V-D can be substituted, unsubstituted, halogenated, and/or fluorinated. In one example of a trisiloxane according to Formula V, $R_7$ is represented by Formula V-A with $R_9$ as an organic spacer and $R_8$ is represented by Formula V-C with $R_{13}$ as an organic spacer. In another example of a trisiloxane according to Formula V, $R_7$ is represented by Formula V-A with $R_9$ as nil and $R_8$ is represented by Formula V-C with $R_{13}$ as nil. In another example of a trisiloxane according to Formula V, $R_7$ is represented by Formula V-B and $R_8$ is represented by Formula V-D. In another example of a trisiloxane according to Formula V, $R_7$ is represented by Formula V-A with $R_9$ as an organic spacer and $R_8$ is represented by Formula V-D. In another example of a trisiloxane according to Formula V, $R_7$ is represented by Formula V-A with $R_9$ as an organic spacer and $R_8$ is represented by Formula V-D. In some instances, $R_1$, $R_2$, $R_3$, $R_4$, $R_5$, and $R_6$ is each a methyl group. A trisiloxane represented by Formula V can be a first siloxane or a second siloxane depending on the selection of variables present in the trisiloxane.

Formula V-E through Formula V-H are examples of trisiloxanes according to Formula V. Formula V-E and Formula V-F illustrate trisiloxanes suitable for use as a first siloxane where each of the terminal silicons are linked to a non-crosslinked side-chain that includes a poly(ethylene oxide) moiety. Formula V-E illustrates an organic spacer positioned between each poly(ethylene oxide) moiety and the terminal silicon. Formula V-F illustrates each of the terminal silicons linked directly to a poly(ethylene oxide) moiety.

Formula V-E:

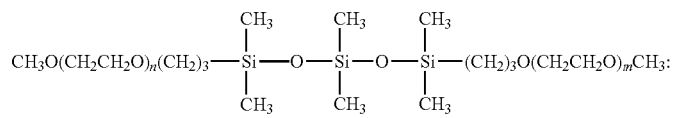

wherein n is 1 to 12 and m is 1 to 12.
Formula V-F:

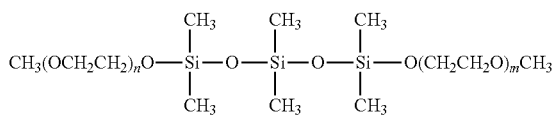

wherein n is 1 to 12 and m is 1 to 12.

Formula V-G and Formula V-H each illustrate a trisiloxane with a terminal silicon linked to a noncrosslinked side-chain that includes a cyclic carbonate moiety. Formula V-G illustrates a trisiloxane suitable for use as a first siloxane where one of the terminal silicons is linked to a noncrosslinked side-chain that includes a cyclic carbonate moiety and one of the terminal silicons linked to a noncrosslinked side-chain that includes a poly(ethylene oxide) moiety. Formula V-H illustrates a trisiloxane suitable for use as a second siloxane where each of the terminal silicons linked to a noncrosslinked side-chain that includes a cyclic carbonate moiety.
Formula V-G:

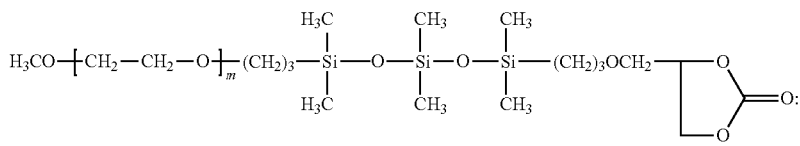

wherein m is 1 to 12.
Formula V-H:

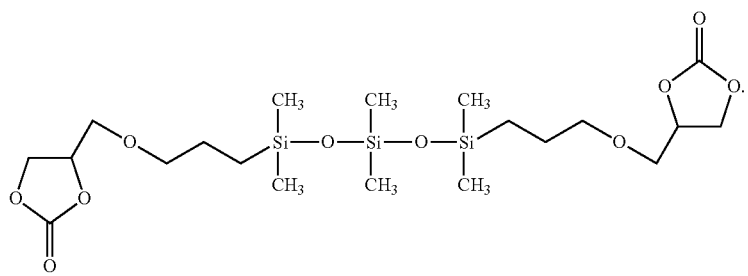

Another suitable trisiloxane includes a backbone with a first terminal silicon, a central silicon and a second terminal silicon. The central silicon is linked to a central substituent. The central substituent can be a noncrosslinked side-chain that includes a cyclic carbonate moiety, or that includes a poly(alkylene oxide) moiety linked directly to the central silicon. Alternately, the central substituent can be a cross-link that crosslinks the trisiloxane to a second siloxane and that includes a poly(alkylene oxide) moiety.

In some instances, the trisiloxane includes not more than two poly(alkylene oxide) moieties or not more than one poly(alkylene oxide) moiety. Additionally or alternately, the trisiloxane can include not more than two carbonate moieties or not more than one carbonate moiety. The entities linked to the first terminal silicon and the entities linked to the second terminal silicon can each exclude a poly(alkylene oxide) moiety and/or each exclude a cyclic carbonate moiety. Additionally or alternately, the entities linked to the central silicon, other than the central substituent, can exclude a poly(alkylene oxide) moiety and/or exclude a cyclic carbonate moiety. In one example, each of the entities linked to the silicons in the backbone of the trisiloxane, other than the central substituent, exclude both a poly(alkylene oxide) moiety and a cyclic carbonate moiety. Examples of entities that may be linked to the silicons include, but are not limited to, substituents such as noncrosslinked side-chains, halogens and cross-links.

An example of a suitable trisiloxane is represented by the following Formula VI:

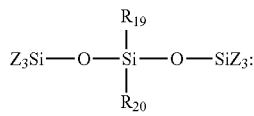

wherein $R_{19}$ is an alkyl group or an aryl group; $R_{20}$ is represented by Formula VI-A, Formula VI-B or Formula VI-C; and the Zs are each an alkyl or an aryl group and can be the same or different. Formula VI-A:

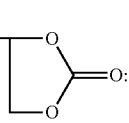

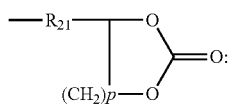

wherein $R_{21}$ is an organic spacer and p is 1 to 2. Suitable organic spacers can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{21}$ is a bivalent ether moiety represented by: —$CH_2$—O—($CH_2$)$_3$— with the —($CH_2$)$_3$— linked to a silicon on the backbone of the trisiloxane. In another example, $R_{21}$ is a alkylene oxide moiety represented by: —$CH_2$—O— with the oxygen linked to a silicon on the backbone of the trisiloxane.

Formula VI-B:

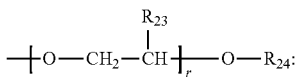

wherein $R_{23}$ is hydrogen; alkyl or aryl; $R_{24}$ is alkyl or aryl; and r is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{22}$ is represented by: —$(CH_2)_3$—. Formula VI-C:

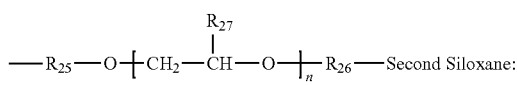

where $R_{25}$ is nil or a spacer; $R_{26}$ is nil or a spacer; $R_{27}$ is hydrogen, alkyl or aryl; second siloxane represents another siloxane and n is 1 to 12. When $R_{25}$ and/or $R_{26}$ is a spacer, the spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. When $R_{26}$ is a spacer, $R_{26}$ can be linked to a silicon in the backbone of the second siloxane. When $R_{26}$ is nil, the poly(ethylene oxide) moiety can be linked to a silicon in the backbone of the second siloxane. The second siloxane can represent another trisiloxane. When the second siloxane is a trisiloxane, $R_{26}$ or the poly(ethylene oxide) moiety can be linked to a central silicon in the backbone of the second trisiloxane.

One or more of the alkyl and aryl groups specified in Formula VI through Formula VI-C can be substituted, unsubstituted, halogenated, and/or fluorinated. In one example of a trisiloxane according to Formula VI, $R_{20}$ is represented by Formula VI-A. In another example of the trisiloxane, $R_{20}$ is represented by Formula VI-B. In another example, $R_{20}$ is represented by Formula VI-C, $R_{25}$ is nil, $R_{26}$ is nil and the poly(ethylene oxide) moiety is linked to a silicon in the backbone of the second siloxane. In another example, $R_{20}$ is represented by Formula VI-C, $R_{25}$ is a spacer, $R_{26}$ is a spacer linked to a silicon in the backbone of the second siloxane. In another example, $R_{25}$ is a spacer with the same structure as $R_{26}$. In another example of a trisiloxane according to Formula VI, $R_{19}$ and each of the Z represent methyl groups. A trisiloxane represented by Formula VI can be a first siloxane or a second siloxane depending on the selection of variable present in the trisiloxane.

Formula VI-D through Formula VI-F are examples of trisiloxanes according to Formula VI. Formula VI-D illustrates a trisiloxane suitable for use as a first siloxane where the central silicon is linked to a noncrosslinked side-chain that includes a poly(ethylene oxide) moiety linked directly to the central silicon. Formula VI-D:

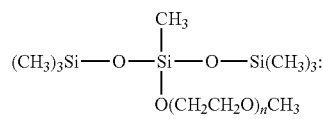

wherein n is 1 to 12.

Formula VI-E and Formula VI-F each illustrate a trisiloxane suitable for use as a first siloxane where a central silicon is linked to a crosslink that includes a poly(ethylene oxide) moiety and that cross-links the trisiloxane to a second trisiloxane. Formula VI-E illustrates the crosslink including a spacer positioned between the poly(ethylene oxide) moiety and each of the trisiloxanes. Formula VI-F illustrates a silicon in the backbone of each trisiloxane linked directly to a poly(ethylene oxide) moiety. Formula VI-E:

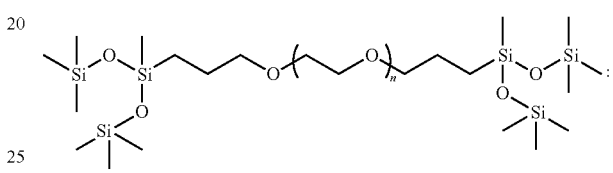

wherein n is 1 to 12. Formula VI-F:

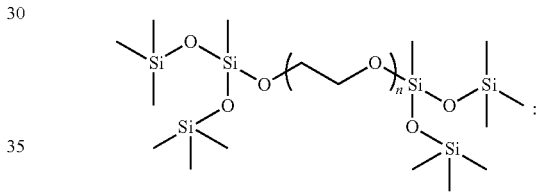

wherein n is 1 to 12.

One or more first siloxanes and/or one or more second siloxanes can be a disiloxane. An example of a suitable disiloxane includes a backbone with a first silicon and a second silicon. A disiloxane serves as a first siloxane when one or more silicons in the backbone are linked to a first substituent and one or more silicons are linked to a second substituent. Alternately, a disiloxane serves as a first siloxane when one or more silicons in the backbone are linked to a first substituent and the disiloxane excludes second substituents. A disiloxane serves as a second siloxane when one or more silicons in the backbone are linked to a second substituent and the disiloxane exclude first substituents. The first substituent includes a poly(alkylene oxide) moiety and the second substituent includes a cyclic carbonate moiety.

Suitable first substituents include noncrosslinked side-chains or crosslinks to other disiloxanes. When the disiloxanes includes more than one first substituent, each of the first substituents can be the same or different. In one example of the disiloxane, each of the first substituents is a noncrosslinked side-chain. Suitable second substituents include noncrosslinked side-chains. When the disiloxane includes more than one second substituent, each of the second substituents can be the same or different.

In one example of the disiloxanes, the first silicon is linked to one or more first substituents and/or to one or more second substituents. As the number of substituents that include a poly(alkylene oxide) moiety and/or a cyclic carbonate moiety increase, the viscosity of an electrolyte can increase undesirably and/or the ionic conductivity of an electrolyte can decrease undesirably. As a result, some embodiments of the disiloxane include no more than one poly(alkylene oxide) moiety and/or no more than one cyclic carbonate moiety. For instance, the entities linked to the second substituent can each exclude a poly(alkylene oxide) moiety and/or a cyclic carbonate moiety. Alternately, the first silicon can be linked to only one first substituents or to only one second substituent and the remaining entities linked to the first silicon and the second silicon can each exclude a poly(alkylene oxide) moiety and a cyclic carbonate moiety. In some instances, the disiloxane excludes a poly(alkylene oxide) moieties or excludes cyclic carbonate moieties.

In another example of the disiloxanes, the first silicon is linked to one or more first substituents and/or to one or more second substituents and the second silicon is linked to one or more first substituents and/or to one or more second substituents. As noted above, the viscosity of an electrolyte can increase undesirably and/or the ionic conductivity of an electrolyte can decrease undesirably as the number of substituents that include a poly(alkylene oxide) moiety and/or a cyclic carbonate moiety increases. As a result, the disiloxanes can include no more than two poly(alkylene oxide) moiety and/or no more than two cyclic carbonate moiety. For instance, the first silicon can be linked to only one first substituents or to only one second substituent, and the second silicon can be linked to only one first substituents or to only one second substituent, and the remaining entities linked to the first silicon and the second silicon can each exclude a poly(alkylene oxide) moiety and a cyclic carbonate moiety.

Examples of suitable disiloxanes and disiloxane electrolytes are disclosed in U.S. Provisional Patent Application Ser. No. 60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices," and in U.S. patent application Ser. No. 10/971,507, filed on Oct. 21, 2004, and entitled "Electrochemical Device Having Electrolyte Including Disiloxane;" and in U.S. patent application Ser. No. 11/056,866, filed on Feb. 10, 2005, and entitled "Electrochemical Device Having Electrolyte Including Disiloxane;" each of which is incorporated herein in its entirety.

Formula VII provides an example of a suitable disiloxane.
Formula VII:

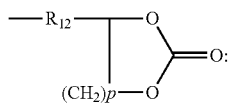

wherein $R_1$ is an alkyl group or an aryl group; $R_2$ is an alkyl group or an aryl group; $R_3$ is an alkyl group or an aryl group; $R_4$ is an alkyl group or an aryl group; $R_5$ is represented by Formula VII-A, Formula VII-B or Formula VII-C; $R_6$ is an alkyl group, an aryl group, represented by Formula VII-D, or represented by Formula VII-E.
Formula VII-A:

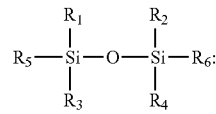

wherein $R_9$ is nil or a spacer; $R_{10}$ is hydrogen; alkyl or aryl; $R_{11}$ is alkyl or aryl; and n is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_9$ is represented by: —$(CH_2)_3$—.
Formula VII-B:

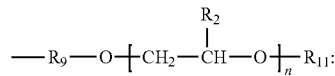

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the disiloxane. In another example, $R_{12}$ is a alkylene oxide moiety represented by: —$CH_2$—O— with the oxygen linked to a silicon on the backbone of the disiloxane.
Formula VII-C:

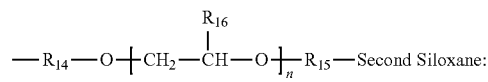

where $R_{14}$ is nil or a spacer; $R_{15}$ is nil or a spacer; $R_{16}$ is hydrogen, alkyl or aryl; second siloxane represents another siloxane and n is 1 to 12. The spacers can be organic spacers and can include one or more —$CH_2$— groups. Other suitable spacers can include an alkylene, alkylene oxide or a bivalent ether group. These spacers can be the same or different and can be substituted or unsubstituted. The above spacers can be completely or partially halogenated. For instance, the above spacers can be completely or partially fluorinated. In one example, $R_{14}$ and $R_{15}$ are each represented by: —$(CH_2)_3$—.
Formula VII-D:

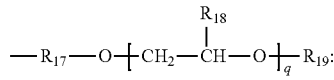

wherein $R_{17}$ is nil or a spacer; $R_{18}$ is hydrogen; alkyl or aryl; $R_{19}$ is alkyl or aryl; and q is 1 to 12. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{17}$ is represented by: —$CH_2$—O—$(CH_2)_3$— with the —$(CH_2)_3$— linked to a silicon on the backbone of the disiloxane.

Formula VII-E:

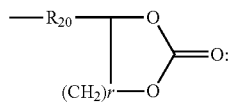

wherein $R_{20}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{20}$ is a bivalent ether moiety represented by: —$CH_2$—O—($CH_2$)$_3$— with the —($CH_2$)$_3$— linked to a silicon on the backbone of the disiloxane. In another example, $R_{20}$ is a alkylene oxide moiety represented by: —$CH_2$—O— with the oxygen linked to a silicon on the backbone of the disiloxane.

In the disiloxanes illustrated in Formula VII: $R_5$ can represent Formula VII-A or Formula VII-B; or $R_5$ can represent Formula VII-A or Formula VII-C; or $R_5$ can represent Formula VII-B or Formula VII-C. Additionally or alternately: $R_6$ can represent an alkyl group or an aryl group or Formula VII-D; $R_6$ can represent an alkyl group or an aryl group or Formula VII—E. In some instances, $R_1$, $R_2$, $R_3$ and $R_4$ are each an alkyl group. For instance, $R_1$, $R_2$, $R_3$ and $R_4$ can each be a methyl group.

include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{23}$ has a structure according to: —($CH_2$)$_3$—. In another example, the Zs, $R_{21}$, $R_{22}$ and $R_{25}$ are each a methyl group. In a preferred example, the Zs, $R_{21}$, $R_{22}$ and $R_{25}$ are each a methyl group, $R_{23}$ has a structure according to: —($CH_2$)$_3$— and $R_{24}$ is a hydrogen. In a more preferred example, the Zs, $R_{21}$, $R_{22}$ and $R_{25}$ are each a methyl group, $R_{23}$ has a structure according to: —($CH_2$)$_3$—; $R_{24}$ is a hydrogen; and x is 3. A preferred example of the disiloxane is provided in the following Formula VII-G:

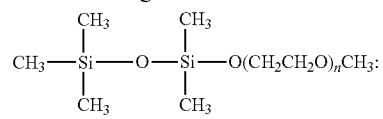

wherein n is 1 to 12. A particularly preferred disiloxane is represented by Formula VII-G with n=3.

The first silicon and the second silicon can each be linked to a first substituent. For instance, the disiloxane can be represented by Formula VII with $R_5$ represented by Formula VII-A and $R_6$ represented by Formula VII-D. An example of the disiloxanes is provided in the following Formula VII-H:

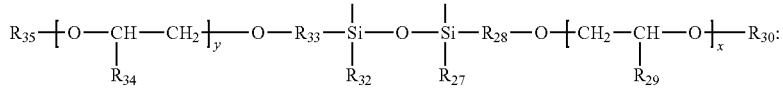

In one example of the disiloxane, the first substituent is a noncrosslinked side-chain that includes a poly(alkylene oxide) moiety. The poly(alkylene oxide) moiety can include an oxygen linked directly to the first silicon. For instance, the disiloxanes can be represented by Formula VII with $R_5$ represented by Formula VII-A and $R_9$ as nil. Alternately, a spacer can link the poly(alkylene oxide) moiety to the first silicon. For instance, the disiloxanes can be represented by Formula VII with $R_5$ represented by Formula VII-A and $R_9$ as a divalent organic moiety. The disiloxanes represented by Formula VII can be a first siloxane or a second siloxane depending on the selection of variables present in the disiloxane.

When the disiloxane includes a noncrosslinked side-chain that includes a poly(alkylene oxide) moiety, each of the entities linked to the second silicon can be alkyl groups and/or aryl groups. The disiloxanes can be represented by Formula VII with $R_5$ represented by Formula VII-A and $R_6$ as an alkyl group or an aryl group. Formula VII-F provides an example of a disiloxanes that is suitable for use as a first siloxane. Formula VII-F:

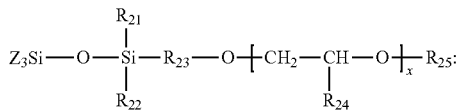

where $R_{21}$ is an alkyl group or an aryl group; $R_{22}$ is an alkyl group or an aryl group; $R_{23}$ is nil or a spacer; $R_{24}$ is a hydrogen atom or an alkyl group; $R_{25}$ is an alkyl group; Z is an alkyl or an aryl group and the Zs can be the same or different and x is from 1 to 30. The spacer can be an organic spacer and can wherein $R_{26}$ is an alkyl group or an aryl group; $R_{27}$ is an alkyl group or an aryl group; $R_{28}$ is nil or a spacer; $R_{29}$ is a hydrogen atom or an alkyl group; $R_{30}$ is an alkyl group; $R_{31}$ is an alkyl group or an aryl group; $R_{32}$ is an alkyl group or an aryl group; $R_{33}$ is nil or a spacer; $R_{34}$ is a hydrogen atom or an alkyl group; $R_{35}$ is an alkyl group; x is from 1 to 30 and y is from 1 to 30. $R_{28}$ and $R_{33}$ can be the same or different. Each spacer can be an organic spacer and can include one or more —$CH_2$— groups. Other suitable spacers can include an alkylene, alkylene oxide or bivalent ether. These spacers can be substituted or unsubstituted. The above spacers can be completely or partially halogenated. For instance, the above spacers can be completely or partially fluorinated. In one example, $R_{28}$ and $R_{33}$ each has a structure according to: —($CH_2$)$_3$—. In another example, $R_{26}$, $R_{27}$, $R_{31}$, and $R_{32}$ are each an alkyl group. In another example, $R_{26}$, $R_{27}$, $R_{30}$, $R_{31}$, $R_{32}$, and $R_{35}$ are each a methyl group. In another example, $R_{30}$ and $R_{35}$ have the same structure, $R_{29}$ and $R_{34}$ have the same structure, $R_{28}$ and $R_{33}$ have the same structure and $R_{26}$, $R_{27}$, $R_{31}$, and $R_{32}$ have the same structure. A preferred example of the disiloxane is presented in Formula VII-J:

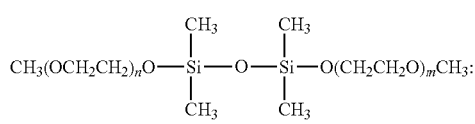

wherein n is 1 to 12 and m is 1 to 12. A particularly preferred disiloxane is represented by Formula VII-J with n=3 and m=3.

When a first siloxane is a disiloxane with a first silicon linked to a first substituent, the second silicon can be linked to a second substituent. For instance, the disiloxane can be represented by Formula VII with $R_5$ represented by Formula VII-A and $R_6$ represented by Formula VII-E.

In another example of a disiloxanes suitable for serving as a first siloxane, the first silicon is linked to a first substituent that crosslinks the disiloxane to a second siloxane. The poly(alkylene oxide) moiety in the first substituent can include an oxygen linked directly to the first silicon. For instance, the disiloxane can be represented by Formula VII with $R_5$ represented by Formula VII-C and $R_{14}$ as nil. In some instances, the poly(alkylene oxide) moiety also includes a second oxygen liked directly to the backbone of the second siloxane. For instance, the disiloxane can be represented by Formula VII with $R_5$ represented by Formula VII-C, $R_{14}$ as nil, and $R_{15}$ as nil. Alternately, a spacer can link the poly(alkylene oxide) moiety to the first silicon. For instance, the disiloxanes can be represented by Formula VII with $R_5$ represented by Formula VII-A and $R_{14}$ as a divalent organic moiety. In some instances, the poly(alkylene oxide) moiety also includes a second spacer linking the poly(alkylene oxide) moiety to the backbone of the second siloxane. For instance, the disiloxane can be represented by Formula VII with $R_5$ represented by Formula VII-C, $R_{14}$ as a divalent organic moiety, and $R_{15}$ as a divalent organic moiety.

When a first substituent crosslinks the disiloxane to a second siloxane, each of the entities linked to the second silicon can be an aryl group or an alkyl group. For instance, the second substituent can be an alkyl group or an aryl group. The disiloxanes can be represented by Formula VII with $R_5$ represented by Formula VII-C and $R_6$ as an alkyl group or an aryl group. Formula VII-K provides an example of the disiloxane where the poly(alkylene oxide) moiety includes an oxygen linked directly to the first silicon. Formula VII-K:

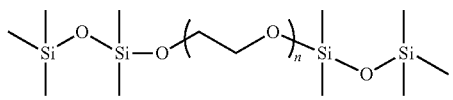

wherein n is 1 to 12. Formula VII-L provides an example of the disiloxane where an organic spacer is positioned between the poly(alkylene oxide) moiety and the first silicon. Formula VII-L:

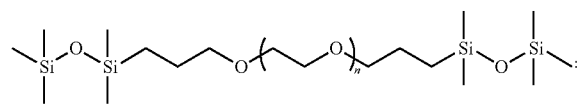

wherein n is 1 to 12.

When a first substituent crosslinks the disiloxane to a second siloxane, the second substituent can be a noncrosslinked side-chain that includes a poly(alkylene oxide) moiety. For instance, the disiloxane can be represented by Formula VII with $R_5$ represented by Formula VII-C and $R_6$ represented by Formula VII-D.

When a first substituent crosslinks the disiloxane to a second siloxane, the second silicon can be linked to a second substituent. For instance, the disiloxanes can be represented by Formula VII with $R_5$ represented by Formula VII-C and $R_6$ represented by Formula VII-E.

Another example of the disiloxanes excludes first substituents and includes one or more second substituents. For instance, the disiloxane can be represented by Formula VII with $R_5$ represented by Formula VII-B.

When the first silicon is linked to one or more second substituents, each of the entities linked to the second silicon can be an aryl group or an alkyl group. For instance, the second substituent can be an alkyl group or an aryl group. A disiloxane can be represented by Formula VII with $R_5$ represented by Formula VII-B and with $R_6$ as an alkyl group or an aryl group. An example of a disiloxane suitable for serving as a second siloxane is presented by the following Formula VII-M:

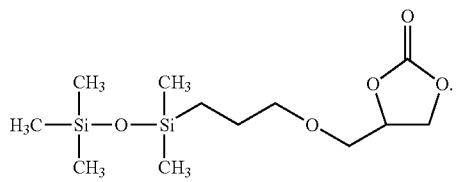

The first silicon and the second silicon can each be linked to a second substituent. For instance, the disiloxane can be represented by Formula VII with $R_5$ represented by Formula VII-B and $R_6$ represented by Formula VII-E. The structure of the first substituents can be the same or different. A preferred example of the disiloxane is presented by the following Formula VII-N:

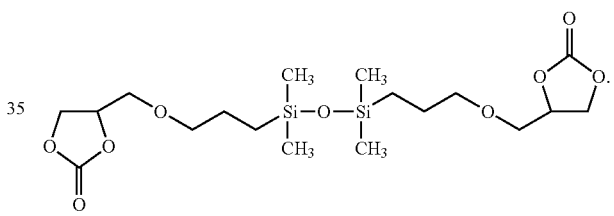

The electrolyte can include a single disiloxane and none or more other siloxanes. Alternately, the electrolyte can include two or more disiloxanes and none or more other siloxanes. Examples of other suitable siloxanes include, but are not limited to, disiloxanes, trisiloxanes, tetrasiloxanes, pentasiloxanes, oligosiloxanes or polysiloxanes. Suitable disiloxanes are disclosed in U.S. patent application Ser. No. 10/971,507, filed on Oct. 21, 2004, entitled "Electrochemical Device Having Electrolyte Including Disiloxane" and incorporated herein in its entirety. Suitable trisiloxanes are disclosed in U.S. patent application Ser. No. 10/971,913, filed on Oct. 21, 2004, entitled "Electrochemical Device Having Electrolyte Including Trisiloxane" and incorporated herein in its entirety. Suitable tetrasiloxanes are disclosed in U.S. patent application Ser. No. 10/971,926, filed on Oct. 21, 2004, entitled "Electrochemical Device Having Electrolyte Including Tetrasiloxane" and incorporated herein in its entirety. Other suitable disiloxanes, trisiloxanes, and tetrasiloxanes are disclosed in U.S. Provisional Patent Application Ser. No. 60/543,951, filed on Feb. 11, 2004, entitled "Siloxane," and incorporated herein in its entirety; and U.S. Provisional Patent Application Ser. No. 60/542,017, filed on Feb. 4, 2004, entitled "Nonaqueous Electrolyte Solvents for Electrochemical Devices," and incorporated herein in its entirety; and U.S. Provisional Patent Application Ser. No. 60/543,898, filed on Feb. 11, 2004, entitled "Siloxane Based Electrolytes for Use in Electrochemical Devices," and incorporated herein in its entirety. In some instances, at least one of the two or more disiloxanes is chosen from those represented by Formula VII through Formula VII-N. Alternately, each of the disiloxanes can be chosen from those represented by Formula VII through Formula VII-N.

As noted above, the solvent can include one or more first silanes and/or one or more second silanes. A silane serves as a first silane when it includes a silicon linked to one or more first substituents and linked to one or more second substituents. Alternately, a silane serves as a first silane when it includes a silicon linked to one or more first substituents and excludes second substituents. A silane serves as a second silane when it includes a silicon linked to one or more second substituents and excludes first substituents. In some instances, each of the substituents linked to the silicon in a first or second silane exclude silicon(s).

The first substituent includes a poly(alkylene oxide) moiety and the second substituent includes a cyclic carbonate moiety. The second substituent can be a side-chain. First substituents can be a side-chain that includes a poly(alkylene oxide) moiety, and a crosslink that includes a poly(alkylene oxide) moiety and that cross-links the silane to a second silane where a crosslink is exclusive of a noncrosslinked side-chain. A first substituent can include an oxygen linked directly to the silicon or can include a spacer positioned between the poly(alkylene oxide) moiety and the silicon. Suitable spacers include, but are not limited to, organic spacers. In some instances, the poly(alkylene oxide) moiety is a poly(ethylene oxide) moiety. In some instances, the poly(alkylene oxide) moiety is an oligo(alkylene oxide) moiety having from 1 to 15 alkylene oxide units.

Examples of suitable silanes and silane electrolytes are disclosed in U.S. Provisional Patent Application Ser. No. 60/601,452, filed on Aug. 13, 2004, entitled "Electrolyte Including Silane for Use in Electrochemical Devices;" and in U.S. patent application Ser. No. 10/977,313, filed on Oct. 28, 2004, and entitled "Electrolyte Including Silane for Use in Electrochemical Device;" and in U.S. patent application Ser. No. 11/056,869, filed on Feb. 10, 2005, and entitled "Electrolyte Including Silane for Use in Electrochemical Device;" each of which is incorporated herein in its entirety.

A suitable silane can include only one of the first substituents or only one of the second substiteuents linked to a silicon. Alternately, a suitable silane can include a silicon linked to a plurality of first subsituents and/or to a plurality of second substituents. When the silane includes a plurality of the first substituents, the silane can include two of the first substituents, three of the first substituents or four of the first substituents. When the silane includes a plurality of the second substituents, the silane can include two of the second substituents, three of the second substituents or four of the second substituents. Substituent(s) other than the first substituents and the second substituents can each exclude a poly(alkylene oxide) moiety and a cyclic carbonate moiety. For example, suitable substituent(s) other than first substituents and second substituents include, but are not limited to, alkyl groups, aryl groups and halogens. When the silane includes a plurality of first substituents, the first substituents can each be the same or can be different. In one example, the silane includes a plurality of the first substituents and each of the first substituents is different. Alternately, the silane includes a plurality of the first substituents and a portion of the first substituents is different from another portion of the first substituents. In another example, the silane includes a plurality of the second substituents and each of the second substituents is different. Alternately, the silane includes a plurality of the second substituents and a portion of the second substituents is different from another portion of the first substituents.

An example silane includes a silicon linked to one or more first substituents that are each noncrosslinked side-chains and excludes first substituents that are crosslinks. Another example of the silane includes a silicon linked to one or more first substituents that are each crosslinks and excludes first substituents that are noncrosslinked side-chains.

An example silane includes a silicon linked to one or more side-chains that each include a poly(alkylene oxide) moiety; to one or more side-chains that each include a cyclic carbonate moiety; and to one or more substituents that each exclude a poly(alkylene oxide) moiety and a cyclic carbonate moiety. Another example of the silane includes a silicon linked to one or more side-chains that each include a cyclic carbonate moiety; to one or more crosslinks that each include a poly(alkylene oxide) moiety; and to one or more substituents that each exclude a poly(alkylene oxide) moiety and a cyclic carbonate moiety. In another example, the silane includes a silicon linked to one or more side-chains that each include a poly(alkylene oxide) moiety; to one or more crosslinks that each include a poly(alkylene oxide) moiety; and to one or more substituents that each exclude a poly(alkylene oxide) moiety and a cyclic carbonate moiety.

One example of a suitable silane includes a silicon linked to four side-chains that each include a poly(alkylene oxide) moiety. Accordingly, the silane can exclude cyclic carbonate moieties. In another example, the silane includes a silicon linked to four side-chains that each include a cyclic carbonate moiety. Accordingly, the silane can exclude poly(alkylene oxide) moieties.

An example of the silane can be represented by the following Formula VIII: $SiR_{4-x-y}R'_xR''_y$; wherein R excludes a poly(alkylene oxide) moiety and a cyclic carbonate moiety and can be an alkyl group, an aryl group or a halogen, $R'_x$ is a first substituent and can be represented by Formula VIII-A or Formula VIII-C, $R''_y$ is a first substituent and can be represented by Formula VIII-B, x indicates the number of R' substituents included in the silane and is 0 to 4, y indicates the number of R" substituents included in the silane is 0 to 4, 4-x-y indicates the number of R substituents, and x+y is at least 1.

Formula VIII-A:

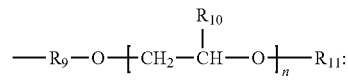

wherein $R_9$ is nil or an organic spacer; $R_{10}$ is hydrogen; alkyl or aryl; $R_{11}$ is alkyl or aryl; and n is 1 to 15. The spacer can be an organic spacer and can include one or more —$CH_2$— groups. Other suitable spacers can include an alkylene, alkylene oxide or a bivalent ether group. These spacers can be substituted or unsubstituted. In one example, $R_9$ is represented by: —$(CH_2)_3$—.

Formula VIII-B:

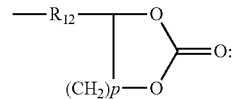

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—($CH_2$)$_3$— with the —($CH_2$)$_3$— linked to a silicon on the backbone of the silane. In another example, $R_{12}$ is an alkylene oxide moiety represented by: —$CH_2$—O— with the oxygen linked to a silicon on the backbone of the silane.

Formula VIII-C:

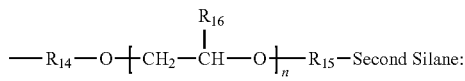

where $R_{14}$ is nil or a spacer; $R_{15}$ is nil or a spacer; $R_{16}$ is hydrogen, alkyl or aryl; second silane represents another silane and n is 1 to 15. The spacers can be organic spacers and can include one or more —$CH_2$— groups. Other suitable spacers can include an alkylene, alkylene oxide or a bivalent ether group. These spacers can be the same or different and can be substituted or unsubstituted. In one example, $R_{14}$ and $R_{15}$ are each represented by: —($CH_2$)$_3$—. The second silane can be represented by: —$SiR_{3-p-q}R'_pR''_q$, wherein R are each an alkyl group or an aryl group, R' is a substituent that includes a poly(alkylene oxide) moiety and can be represented by Formula VIII-A or Formula VIII-C, R" is a substituent that includes a cyclic carbonate moiety and can be represented by Formula VIII-B, p is the number of R' substituents included on the second silane and is 0 to 3, q is the number of R" substituents included on the second silane, 3-p-q is the number of R substituents, and is 0 to 3. In one example, p is 0 and q is 0. In another example, p+q is greater than or equal to 1. In yet another example, p is greater than or equal to 1. In still another example, q is greater than or equal to 1. In another example, R' is represented by Formula VIII-A and R" is represented by Formula VIII-B, p is 0 to 3 and q is 0 to 3.

One or more of the alkyl and aryl groups specified in Formula VIII through Formula VIII-C can be substituted, unsubstituted, halogenated, and/or fluorinated. When the silane includes more than one substituent represented by Formula the entities can be the same or different. When the silane includes more than one substituent represented by Formula VIII-B, the entities can be the same or different. When the silane includes more than one substituent represented by Formula VIII-C, the entities can be the same or different.

In one example of the silane according to Formula VIII, x=0. In another example, x is 1 to 3. In another example, y=0. In still another example, y is 1 to 3. In another example, x+y=4 or x+y=2.

In some instances, R' is represented by Formula VIII-A, x is greater than 0, and $R_9$ is nil. In other instances, R' is represented by Formula VIII-A and $R_9$ is an organic spacer. In an example, R" is represented by Formula VIII-B and y is greater than 0. In another example, R' is represented by Formula VIII-C, x is greater than 0, $R_{14}$ is nil and $R_{15}$ is nil. In still another example, R' is represented by Formula VIII-C, x is greater than 0, $R_{14}$ is an organic spacer and $R_{15}$ is an organic spacer.

When the silane includes more than one substituent represented by Formula the entities can be the same or different. When the silane includes more than one substituent represented by Formula VIII-B, the entities can be the same or different. When the silane includes more than one substituent represented by formula VIII-C, the entities can be the same or different. Silanes represented by Formula VIII can be first silane or second silanes depending on the selection of variables included in the silane.

A preferred silane includes a silicon linked to one first substituent and to three other substituents that each exclude a poly(alkylene oxide) moiety and a cyclic carbonate moiety. For instance, the silane can be represented by Formula VIII with x=1, y=0 and the R' represented by Formula VIII-A. Formula VIII-D presents an example of silane that is suitable for use as a first silane and that includes a silicon linked to one noncrosslinked side-chain that includes a poly(ethylene oxide) moiety, and linked to three alkyl groups. The poly (ethylene oxide) moiety of Formula VIII-D includes an oxygen liked directly to the silicon. Formula VIII-D:

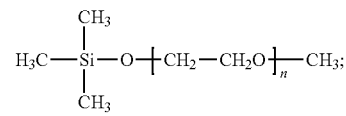

wherein n is 1 to 15. In a preferred silane according to Formula VIII-D, n=3. Formula VIII-E presents an example of a silane suitable for use as a first silane that includes a silicon linked to one noncrosslinked side-chain that includes a poly (alkylene oxide) moiety, and linked to three alkyl groups. The noncrosslinked side-chain of Formula VIII-E includes an organic spacer positioned between the silicon and the poly (ethylene oxide) moiety. Formula VIII-E:

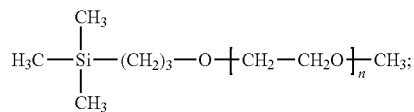

wherein n is 1 to 15. In a preferred silane according to Formula VIII-E, n=3. Formula VIII-F presents another example of the silane that includes a silicon linked to one noncrosslinked side-chain that includes a poly(alkylene oxide) moiety, and linked to three alkyl groups. The noncrosslinked side-chain of Formula VIII-F includes an organic spacer positioned between the silicon and the poly(alkylene oxide) moiety. Formula VIII-F:

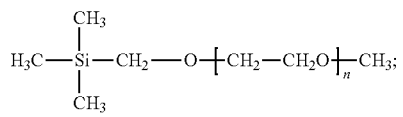

wherein n is 1 to 15. In a preferred silane according to Formula VIII-F, n=3.

A preferred silane includes a silicon linked to two noncrosslinked side-chains that each include a poly(alkylene oxide) moiety and linked to two other substituents that each exclude a poly(alkylene oxide) moiety and a cyclic carbonate moiety. For instance, the silane can be represented by Formula VIII with x=2 and y=0. One or both R' can be represented by Formula VIII-A. One or both R' can be represented by Formula VIII-C. In some instances, one R' is represented by Formula VIII-A and one R' is represented by Formula VIII-C. Formula VIII-G is an example of the silane that includes a silicon linked to two noncrosslinked side-chains that each include a poly(ethylene oxide) moiety and linked to two alkyl groups. Formula VIII-G:

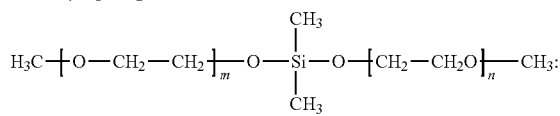

wherein m is 1 to 15, n is 1 to 15 and m can be different from n or the same as n. In a preferred silane according to Formula VIII-G, m=3 and n=3. Formula VIII-H is an example of the silane that includes a silicon linked to two noncrosslinked side-chains that each include a poly(ethylene oxide) moiety, and linked to an alkyl group, and linked to an aryl group. Formula VIII-H:

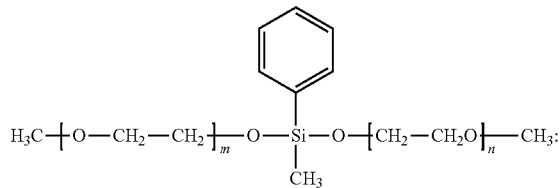

wherein m is 1 to 15, n is 1 to 15 and m can be different from n or the same as n. In a preferred silane according to Formula VIII-H, m=3 and n=3.

A silane suitable for use as a second silane includes a silicon linked to a second substituent and linked to three other substituents that each exclude a poly(alkylene oxide) moiety and a cyclic carbonate moiety. For instance, the silane can be represented by Formula VIII with x=0 and y=1. Formula VIII-J and Formula VIII-K show preferred examples of a silane that includes a silicon linked to a noncrosslinked side-chain that includes a cyclic carbonate moiety and linked to three alkyl groups. Formula VIII-J:

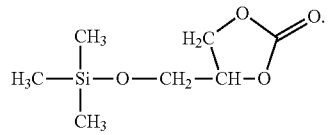

Formula VIII-K:

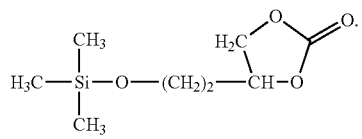

Formula VIII-L is another example of the silane that includes a silicon linked to a noncrosslinked side-chain that includes a cyclic carbonate moiety and linked to three alkyl groups. Formula VIII-L:

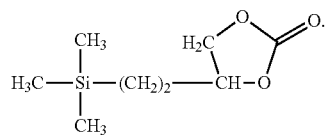

Another example silane includes a silicon linked to a crosslink that includes a poly(alkylene oxide) moiety and linked to three other substituents that each exclude a poly (alkylene oxide) moiety and a cyclic carbonate moiety. For instance, the silane can be represented by Formula VIII with x=1, y=0 and the R' represented by Formula VIII-C. Formula VIII-M is a preferred example of the silane that includes a silicon linked to a crosslink that includes a poly(alkylene oxide) moiety and linked to three alkyl groups. The poly (alkylene oxide) moiety of Formula VIII-M includes an oxygen liked directly to the silicon of each silane. Formula VIII-M:

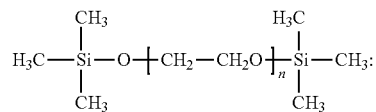

wherein n is 1 to 15. In a preferred silane according to Formula VIII-M, n=4.

The electrolyte can include a single silane. Alternately, the electrolyte can include a plurality of silanes. When the electrolyte includes a plurality of silanes, at least one of the silanes can be chosen from those represented by Formula VIII through Formula VIII-M. Alternately, each of the silanes can be chosen from those represented by Formula VIII through Formula VIII-M. In some instances, the electrolyte includes a silane that excludes poly(alkylene oxide) moieties and a silane that excludes cyclic carbonate moieties. For instance, the electrolyte can include a silane that includes one or more poly(alkylene oxide) moieties and a silane that excludes poly (alkylene oxide) moieties moieties. Alternately, the electrolyte can include a silane that includes one or more cyclic carbonate moieties and a silane that excludes cyclic carbonate moieties. In a preferred example, the electrolyte includes a blend of a silane according to Formula VIII-J and a silane according to Formula VIII-F. In another preferred example, the electrolyte includes a blend of a silane according to Formula VIII-J and a silane according to Formula VIII-D.

In some instances, the solvent includes more than one of the siloxanes or more than one of the silanes. Further, the solvent can include one or more siloxanes combined with one or more silanes. The combination of a silane with other silanes and/or with other siloxanes can reduce the viscosity of the blended solvent. Additionally, the inventors believe that the silanes can improve the mobility of poly(alkylene oxide) in other siloxanes or silanes. Additionally, the combination of a silane with other silanes and/or siloxanes can increase the ability of the solvent to dissociate the salts employed in electrolyte and can accordingly increase the concentration of free ions in the electrolyte. These features can further enhance the ionic conductivity of the electrolytes.

The above siloxanes and silanes can be generated by employing nucleophilic substitutions, hydrosilylation and/or dehydrogenation reactions. Methods for generating the silanes and siloxanes can be found in U.S. patent application Ser. No. 10/810,019, filed on Mar. 25, 2004, entitled "Polysiloxane for Use in Electrochemical Cells;" U.S. Provisional Patent Application Ser. No. 60/543,951, filed on Feb. 11, 2004, entitled "Siloxane;" U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices;" U.S. Provisional Patent Application Ser. No. 60/601,452, filed on Aug. 13, 2004, entitled "Electrolyte Including Silane for Use in Electrochemical Devices;" U.S. patent application Ser. No. 10/971, 507, filed on Oct. 21, 2004, entitled "Electrochemical Device Having Electrolyte Including Disiloxane;" and U.S. patent application Ser. No. 10/971,913, filed on Oct. 21, 2004, entitled "Electrochemical Device Having Electrolyte Including Trisiloxane;" and U.S. patent application Ser. No. 10/971, 926, filed on Oct. 21, 2004, entitled "Electrochemical Device Having Electrolyte Including Tetrasiloxane;" each of which is incorporated herein in its entirety. Additionally, in some instances, the above siloxanes and silanes can be purified as disclosed in U.S. patent application Ser. No. 11/053,338, filed on Feb. 8, 2005, entitled "Reduction of Impurities in Battery Electrolyte," and incorporated herein in its entirety.

In some instances, the solvent includes one or more organic solvents in addition to the mixture of the one or more first siloxanes, one or more first silanes, one or more second siloxanes, and one or more second silanes. Examples of suitable organic solvents include, but are not limited to: cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate; aliphatic carboxylate esters such as methyl formate, methyl acetate and ethyl propionate; gamma-lactones such as .gamma.-butyrolactone; linear ethers such as 1,2-ethoxyethane (DEE) and ethoxymethoxyethane (EME); cyclic ethers such as tetrahydrofuran and 2-methyltetrahydrofuran; and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone; and fluorinated carboxylate esters.

Preferred organic solvents are carbonates such linear carbonates and cyclic carbonates. Cyclic carbonates have shown the capacity to increase the ionic conductivity of the electrolyte. Combinations of cyclic carbonates and linear carbonates have also increased the ionic conductivity of the electrolyte. In some instances, the carbonate organic solvents exclude silicon.

Examples of suitable linear carbonates are represented by Formula IX-A. Formula IX-A:

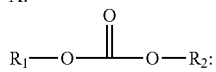

wherein $R_1$ and $R_2$ are each a monovalent organic moiety that can be the same or different from one another. $R_1$ can be a branched or unbranched, and substituted or unsubstituted, and saturated or unsaturated alkyl, aryl or monovalent ether. $R_2$ can be a branched or unbranched, and substituted or unsubstituted, and saturated or unsaturated alkyl, aryl or monovalent ether. In some instances, $R_1$ and $R_2$ each excludes silicon, a polymer and/or an oligomer.

Examples of suitable cyclic carbonates are represented by Formula IX-B. Formula IX-B:

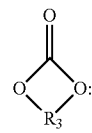

wherein $R_3$ is a divalent organic moiety. $R_3$ can be a branched or unbranched, and substituted or unsubstituted alkylene, and saturated or unsaturated, alkylene oxide, or alkoxy alkyl. In some instances, $R_3$ excludes silicon, a polymer and/or an oligomer.

When the solvent includes one or more organic solvents, a suitable ratio for (total mass of the organic solvent(s)):(mass of the one or more first siloxanes and/or one or more first silanes and one or more second siloxanes and/or one or more second silanes) includes ratios less than 2:1 or less than 1:1 and/or greater than 0.1:1. Ratios less than 1:1 are believed to permit the electrolyte to retain the safety advantages (i.e. volatility suppression) of the siloxanes and silanes while also retaining the viscosity reduction provided by the organic solvent. A preferred ratio is in the range of 0.1:1 to 1:1.

The electrolyte includes one or more salts in the solvent. The one or more salts can include or consist of, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC_4F_9CO_2$, $LiC(CF_3SO_2)_3$, $LiN(SO_2C_2F_5)_2$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, $LiB_{10}Cl_{10}$, lithium lower aliphatic carboxylate, chloroboran lithium, lithium tetraphenylborate, LiBr, LiI, LiSCN, LiCl, imides, Li-methide, Li-imide, lithium alkyl fluorophosphates and mixtures thereof.

The electrolyte can include one or more organoborate salts in addition to above salt(s) or instead of the above salt(s). Suitable organoborate salts include lithium organoborate salt. The organoborate salt can be a bis[bidentate] borate, also known as a bis[chelato] borate. Suitable bis[bidentate] borates include aromatic bis[bidentate] borates such as bis[benzenediolato (2-)—O,O'] borate, bis[substituted benzenediolato (2-)—O,O'] borate, bis[salicylato] borate, bis[substituted salicylato] borate, bis[2,2'-biphenyldiolato (O,O')] borate, and bis[substituted 2,2'-biphenyldiolato (O,O')] borate]. In some instances, the organoborate salt is a nonaromatic bis[bidentate] borate, such as bis[oxalato (2-)-O,O'] borate, bis[malonato (2-)-O,O'] borate, bis[succinato] borate, [.alpha.-hydroxy-carboxylato] borate, [.alpha.-hydroxy-carboxylato] borate, [.beta.-hydroxy-carboxylato] borate, [.beta.-hydroxy-carboxylato] borate, [.alpha.-dicarboxylato] borate, and [.alpha.-dicarboxylato] borate. Examples of lithium bis(bidentate) salts include lithium bis(tetrafluoroethylenediolato)borate $LiB(OCF_2CF_2O)_2$, lithium bis(hexafluoropropylenediolato)borate $LiB[OCF(CF_3)CF_2O]_2$ and lithium bis[1,2-tetrakis(trifluoromethyl)ethylenedialato (2-)O,O—']borate or lithium bis(perfluoropinacolato)borate $LiB[OC(CF_3)_2C(CF_3)_2O]_2$. A preferred lithium bis(bidentate) salt is lithium bis-oxalato borate (LiBOB).

One example of the organoborate salt includes: a boron linked directly to at least two oxygens and an organic moiety linking two of the oxygens. In some instances, the boron is also linked directly to two halogens. Another example of the organoborate salt includes: a boron linked directly to each of four oxygens; a first organic moiety linking two of the oxygens; and a second organic moiety linking the other two oxygens. The first organic moiety and the second organic moiety can be the same or different. The first organic moiety and/or the second organic moiety can be: substituted or unsubstituted; and/or branched or unbranched; and/or saturated or unsaturated. The backbone of an organic moieties extending between the boron linked oxygens can include only carbons or can include carbons and one or more oxygens. In some instances, one or both of the organic moieties are halogenated. In one example, the first organic moiety and/or the second organic moiety is fluorinated.

An example of the organoborate salt is represented by the following Formula X-A:

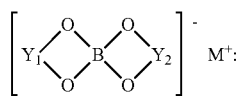

wherein M⁺ is a metal ion selected from the Group I or Group II elements; Y₁ and Y₂ are each selected from the group consisting of —CX(CR₂)ₐCX—, —CZZ'(CR₂)ₐCZZ'—, —CX(CR₂)ₐCZZ'—, —SO₂(CR₂)ᵦSO₂—, and —CO(CR₂)ᵦSO₂—; X is =O or =NR', Z is alkyl, halogenated alkyl, —C=NR', CR'₃ or R'; Z' is alkyl, halogenated alkyl, —C=NR', CR'₃ or R'; R' is halogen or hydrogen; R is hydrogen, alkyl, halogenated alkyl, cyano, or halogen; a is 0 to 4 and b is 1 to 4. M⁺ is preferably selected from Group I and is most preferably lithium. Y₁ and Y₂ can be the same or different. Z and Z' can be the same or different. The R' can be the same or different and the R can be the same or different.

In an example of an organoborate salt according to Formula X-A, Y₁ and Y₂ are each —CX(CR₂)ₐCX—; each X is =O and each R is hydrogen. In another example of the organoborate salt, Y₁ and Y₂ are each —CX(CR₂)ₐCX—; each X is =O and each R is a halogen. In another example of the organoborate salt, Y₁ and Y₂ are each —CX(CR₂)ₐCX—; each X is =O and each R is fluoro.

In a preferred example of an organoborate salt according to Formula X-A, Y₁ and Y₂ are each —CZZ'(CR₂)ₐCZZ'—; each of the R' is hydrogen and each of the R are hydrogen. In another preferred example, Y₁ and Y₂ are each —CZZ'(CR₂)ₐCZZ'—; each of the R' is halogen and each of the R are halogens. In another preferred example, Y₁ and Y₂ are each —CZZ'(CR₂)ₐCZZ'—; each of the R' is fluorine and each of the R are fluorine.

Other suitable organoborate salts for use with the battery include mono[bidentate] borates. For instance, the salt can be a dihalo mono[bidentate] borate such as a dihalo oxalato borate. An example of a dihalo oxalato borate is a difluoro oxalato borate. The organoborate salts can be lithium organoborate salts such as lithium mono[bidentate] borate. For instance, the salt can be a lithium dihalo mono[bidentate] borate such as a lithium dihalo oxalato borate. A preferred lithium dihalo oxalato borate is a lithium difluoro oxalato borate (LiDfOB).

The organoborate salt can include a boron linked directly to two halogens and also linked directly to two oxygens that are linked to one another by an organic moiety. The organic moiety and/or the second organic moiety can be: substituted or unsubstituted; and/or branched or unbranched; and/or saturated or unsaturated. The backbone of the organic moiety can include only carbons or can include carbons and one or more oxygens. In some instances, the organic moiety is completely or partially halogenated. In one example, the organic moiety is fluorinated.

An example of the organoborate salt is represented by the following Formula X-B:

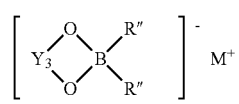

wherein M⁺ is a metal ion selected from the Group I or Group II elements; Y₃ is selected from the group consisting of —CX(CR₂)ₙCX—, —CZZ'(CR₂)ₐCZZ'—, —CX(CR₂)ₐCZZ'—, —SO₂(CR₂)ᵦSO₂—, and —CO(CR₂)ᵦSO₂—; X is =O or =NR', Z is alkyl, halogenated alkyl, —C=NR', CR'₃ or R'; Z' is alkyl, halogenated alkyl, —C=NR', CR'₃ or R'; R" is a halogen; R' is halogen or hydrogen; R is hydrogen, alkyl, halogenated alkyl, cyano, or halogen; a is 0 to 4 and b is 1 to 4. M⁺ is preferably selected from Group I and is most preferably lithium. Z and Z' can be the same or different. The R" can be the same or different. The R' can be the same or different. The R can be the same or different.

In an example of an organoborate salt according to Formula X-B, Y₃ is —CX(CR₂)ₐCX—; each X is =O and each R" is a halogen. In another example of the organoborate salt, Y₃ is —CX(CR₂)ₐCX— and each R" is a fluorine.

In some instances, the organoborate salt is a tridentate borate such as a lithium tridentate borate. Alternately, the organoborate salt can be a tetradentate borate such as lithium tetradentate borate. An example lithium tetradentate borate includes LiB[OC(CF₃)₂]₄.

Examples of other organoborate salts are disclosed in U.S. Provisional Patent Application Ser. No. 60/565,211, filed on Apr. 22, 2004, entitled "Organoborate Salt in Electrochemical Device Electrolytes," and incorporated herein in its entirety; and in U.S. Provisional Patent Application Ser. No. 60/563,850, filed on Apr. 19, 2004, entitled "Organoborate Salt in Electrochemical Device Electrolytes," and incorporated herein in its entirety; and in U.S. Provisional Patent Application Ser. No. 60/563,848, filed on Apr. 19, 2004, entitled "Composition Check for Organoborate Salt Employed in Electrochemical Device Electrolytes," and incorporated herein in its entirety.

The electrolyte can be prepared such that the total concentration of the one or more salts in the solvent is about 0.3 to 2.0 M, about 0.5 to 1.5 M, or about 0.7 to 1.2 M. When organoborate salts are present in the solvent, the total concentration of the one or more organoborate salts in the solvent can be about 0.3 to 2.0 M, about 0.5 to 1.5 M, or about 0.7 to 1.2 M. In some instances, the one or more organoborate salts are present in a concentration less than 0.3 M or less than 0.1 M and other non-organoborate salts are present in the electrolyte.

The electrolyte can optionally include one or more additives that form a passivation layer on the anode. The additives can be reduced and/or polymerize at the surface of the anode to form the passivation layer. Vinyl ethylene carbonate (VEC) and vinyl carbonate (VC) are examples of additives that can form a passivation layer by being reduced and polymerizing to form a passivation layer. When they see an electron at the surface of a carbonaceous anode, they are reduced to Li₂CO₃ and butadiene that polymerizes at the surface of the anode. Ethylene sulfite (ES) and propylene sulfite (PS) form passivation layers by mechanisms that are similar to VC and VEC. In some instances, one or more of the additives has a reduction potential that exceeds the reduction potential of the components of the solvent. For instance, VEC and VC have a reduction potential of about 2.3V vs. Li/Li⁺. This arrangement of reduction potentials can encourage the additive to form the passivation layer before reduction of other electrolyte components and can accordingly reduce consumption of other electrolyte components.

Suitable additives include, but are not limited to, carbonates having one or more unsaturated substituents. For instance, suitable additives include unsaturated and unsubstituted cyclic carbonates such as vinyl carbonate (VC); cyclic alkylene carbonates having one or more unsaturated substituents such as vinyl ethylene carbonate (VEC), and o-phenylene carbonate (CC, C₇H₄O₃); cyclic alkylene carbonates having one or more halogenated alkyl substituents such as ethylene carbonate substituted with a trifluormethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (CIEC). Other suitable additives include, acetates having one or more unsaturated substituents such as vinyl acetate (VA). Other suitable additives include cyclic alkyl sulfites and linear sulfites. For instance, suitable additives include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more one more alkyl substituents and dialkyl sulfites such as dimethyl sulfite (DMS) and diethyl sulfite (DES). Other suitable additives include halogenated-gamma-butyrolactones such as bromo-gamma-butyrolactone (BrGBL) and fluoro-gamma-butyrolactone (FGBL).

The additives can include or consist of one or more additives selected from the group consisting of: dimethyl sulfite (DMS), diethyl sulfite (DES), bromo-gamma-butyrolactone (BrGBL), fluoro-gamma-butyrolactone (FGBL), vinyl carbonate (VC), vinyl ethylene carbonate (VEC), ethylene sulfite (ES), CC, trifluoropropylene carbonate (TFPC), 2-propenyl ethyl carbonate, fluoroethylene carbonate (FEC), chloroethylene carbonate (CIEC), vinyl acetate (VA), propylene sulfite (PS), 1,3 dimethyl butadiene, styrene carbonate, phenyl ethylene carbonate (PhEC), aromatic carbonates, vinyl pyrrole, vinyl piperazine, vinyl piperidine, vinyl pyridine, and mixtures thereof. In another example, the electrolyte includes or consists of one or more additives selected from the group consisting of vinyl carbonate (VC), vinyl ethylene carbonate (VEC), ethylene sulfite (ES), propylene sulfite (PS), and phenyl ethylene carbonate (PhEC). In a preferred example, the electrolyte includes or consists of one or more additives selected from the group consisting of vinyl carbonate (VC), vinyl ethylene carbonate (VEC), ethylene sulfite (ES), and propylene sulfite (PS). In another preferred example, the electrolyte includes vinyl carbonate (VC) and/or vinyl ethylene carbonate (VEC).

In some conditions, certain organoborate salts, such as LiDfOB, can form a passivation layer. As a result, the desirability and/or concentration of additives may be reduced when organoborate are employed as salts. In some instances, the concentration of additives in the electrolyte generally does not greatly exceed the concentration needed to form the passivation layer. As a result, the additives are generally present in smaller concentrations than salts. A suitable concentration for an additive in the electrolyte includes, but is not limited to, concentrations greater than 0.1 wt %, greater than 0.5 wt % and/or less than 5 wt %, less than 20 wt %, or less than 35 wt % where each of the wt % refers to the percentage of the total weight of solvent plus additive. In a preferred embodiment, the concentration of the additive is less than 3 wt % or less than 2 wt %.

The electrolyte can be a liquid. In some instances, the electrolyte is a solid or a gel. For instance, the electrolyte can include a network polymer that interacts with the solvent to form an interpenetrating network. The interpenetrating network can serve as a mechanism for providing a solid electrolyte or gel electrolyte. Alternately, the electrolyte can include one or more solid polymers that are each a solid at room temperature when standing alone. The solid polymer can be employed in conjunction with the solvent to generate an electrolyte such as a plasticized electrolyte as a solid or as a gel. Alternately, one or more silanes and/or one or more siloxanes in the solvent can be crosslinked to provide a solid or gel electrolyte. A polysiloxane is an example of a crosslinkable solvent. Suitable examples for method of forming a crosslinked polymer are disclosed in U.S. patent application Ser. No. 10/810,019, filed on Mar. 25, 2004, entitled "Polysiloxane for Use in Electrochemical Cells" and incorporated herein in its entirety. An electrolyte can be present before crosslinking and/or polymerizing the components of a solid or gel electrolyte and in the final electrolyte.

FIG. 1 is a schematic view of a suitable battery 22. The battery 22 includes an electrolyte 40 activating a cathode 42 and an anode 34. A separator 46 separates the cathode 42 and anode 34. The cathode 42 includes a cathode medium 48 on a cathode substrate 50. The anode 34 includes an anode medium 52 on an anode substrate 54. Although the battery is illustrated as including one anode and one cathode, the battery can include more than one anode and/or more than one cathode with the anodes and cathodes each separated by a separator. Additionally, the battery can have a variety of different configurations such as stacked configuration, a "jellyroll" or wound configurations. In some instances, the battery is hermetically sealed. Hermetic sealing can reduce entry of impurities into the battery. As a result, hermetic sealing can reduce active material degradation reactions due to impurities. The reduction in impurity induced lithium consumption can stabilize battery capacity.

Suitable cathode substrates 50 include, but are not limited to, aluminum, stainless steel, titanium, or nickel substrates. An example of a cathode substrate that can enhance conductivity is a carbon coated aluminum current collector. The carbon coating may be applied using any suitable process known in the art, such as by coating a paste made of carbon and a binder. The thickness of the carbon coating can be less than 15 microns, less than 10 microns, about 3 microns or less, and less than 2 microns.

The cathode medium 48 includes or consists of one or more cathode active materials. Suitable cathode active materials include, but are not limited to, $Li_xVO_y$, $LiCoO_2$, $LiNiO_2$, $LiNi_{1-x}CO_yMe_zO_2LiMn_{0.5}Ni_{0.5}O_2$, $LiMn_{(1/3)}Co_{(1/3)}Ni_{(1/3)}O_2$, $LiFePO_4$, $LiMn_2O_4$, $LiFeO_2$, $LiMc_{0.5}Mn_{1.5}O_4$, $LiMn_{1.5}McO_4$, vanadium oxide, carbon fluoride ($CF_{x''}$) and mixtures thereof wherein Me is Al, Mg, Ti, B, Ga, Si, Mn, Zn, Mo, Nb, V and Ag and combinations thereof, and wherein Mc is a divalent metal such as Ni, Co, Fe, Cr, Cu, and combinations thereof. In some instances, x is $\geq$⅓ before initial discharge of the battery and/or y is in a range of 7/3 to 3 before initial discharge of the battery and/or x' is $\geq$0 before initial discharge of the battery and/or 1−x'+y'+z'=1 and/or x'' is >0 or x'' is $\geq$0.2 before initial discharge of the battery. Example cathode materials include one or more lithium transition metal oxides selected from the group consisting of $Li_xVO_y$, $LiCoO_2$, $LiNiO_2$, $LiNi_{1-x}CO_yMe_zO_2$, $LiMn_{0.5}Ni_{0.5}O_2$, $LiMn_{(1/3)}Co_{(1/3)}Ni_{(1/3)}O_2$, $LiFePO_4$, $LiMn_2O_4$, $LiFeO_2$, $LiMc_{0.5}Mn_{1.5}O_4$.

The cathode medium 48 can optionally include binders, conductors and/or diluents such as PVDF, graphite and acetylene black in addition to the one or more cathode active materials. Suitable binders include, but are not limited to, PVdF, powdered fluoropolymer, powdered polytetrafluoroethylene or powdered polyvinylidene fluoride present at about 1 to about 5 weight percent of the cathode active material. Suitable conductors and/or diluents include, but are not limited to, acetylene black, carbon black and/or graphite or metallic powders such as powdered nickel, aluminum, titanium and stainless steel.

A cathode can be generated by mixing the components of the cathode medium in a slurry. The slurry can be coated on the substrate material and dried so as to form the cathode medium on the substrate.

A suitable material for the anode substrate 54 includes, but is not limited to, lithium metal, titanium, a titanium alloy, stainless steel, nickel, copper, tungsten, tantalum and alloys thereof.

The anode medium 52 includes or consists of one or more anode active materials. In some instances, the anode medium 52 includes a binder. The anode active material can include or consist of a metal selected from Groups IA, IIA and IIIB of the Periodic Table of the Elements. Examples of these anode active materials include lithium, sodium, potassium and their alloys and intermetallic compounds. Examples of suitable alloys include, but are not limited to, Li—Si, Li—B, Li—Si—B, Li—Al. Another example of a suitable lithium alloy is a lithium-aluminum alloy. However, increasing the amounts of aluminum present in the alloy can reduce the energy density of the cell. Examples of suitable intermetallic compounds include, but are not limited to, intermetallic compounds that include or consist of two or more components selected from the group consisting of Li, Ti, Cu, Sb, Mn, Al, Si, Pb, Sn, In, Bi, Ag, Ba, Ca, Hg, Pd, Pt, Te, Zn and La. Other examples of suitable intermetallic compounds include, but are not limited to, intermetallic compounds that include lithium metal and one or more components selected from the group consisting of Ti, Cu, Sb, Mn, Al, Si, Pb, Sn, In, Bi, Ag, Ba, Ca, Hg, Pd, Pt, Te, Zn and La. Specific example of intermetallic compounds include $Cu_6Sn_5$, $Cu_2Sb$, MnSb. Other suitable anode active materials include lithium titanium oxides such as $Li4Ti_5O_{12}$, silica alloys and mixtures of the above anode active materials. Another example of a suitable anode active material includes or consists of a carbonaceous mixture. For instance, the carbonaceous mixture can include a mixture that includes or consists of one, two or three components selected from the group consisting of: carbon beads, carbon fibers, graphite flakes, and graphite spheres.

In some instances, the anode active material consists of lithium metal. Further, the anode active medium can serve as both the anode active medium and as the anode substrate. For instance, the anode can consist of lithium metal. The reaction potential for lithium metals to give up electrons is generally less than 1 V versus $Li/Li^+$ equilibrium potential. The use of a lithium metal anode can increase the energy density of the battery. In some instances, the passivation layer formed by the disclosed siloxane and/or silane solvents can provide a passivation layer on the anode that is sufficiently stable to suppress the dendrite formation problem associated with lithium metal anode. Additionally or alternately, certain organoborate salts can form a passivation lay that is sufficiently stable to suppress dendrite formation.

In instances where the anode includes a substrate, suitable methods for placing the anode active material on the anode substrate include, but are not limited to, lamination, deposition and sputtering.

When an anode is to be formed from materials in a powdered or granular form, an anode can be generated by mixing the components of the anode medium in a slurry. Coating the slurry on the substrate material and drying the slurry so as to form the anode medium on the substrate.

Suitable separators 46 include, but are not limited to, polyolefins such as polyethylene. Illustrative separator materials also include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene/polyethylene membrane commercially available under the designation CELGARD (Celanese Plastic Company, Inc.), a membrane commercially available under the designation DEXIGLAS (C. H. Dexter, Div., Dexter Corp.), and a polyethylene membrane commercially available from Tonen Chemical Corp.

The battery can be a primary battery or a secondary battery. Further, the above cathode, anode and electrolyte combinations can be employed in other electrochemical devices such as capacitors and hybrid capacitors/batteries.

Example 1

A first electrolyte was generated by dissolving lithium difluoro oxalato borate (LiDfOB) to 1.0 M in a silane represented by Formula VIII-D with n=3. A second electrolyte was generated by dissolving lithium difluoro oxalato borate (LiDfOB) to 1.0 M in a mixture having a silane represented by Formula VIII-D with n=3 and a silane represented by Formula VIII-J. The silanes were present in the mixture at a mass ratio of 71:29.

Cathodes were generated by mixing 46.75 g $LiNi_{0.8}Co_{0.15}Al_{0.05}O_2$ (Toda Kogyo Co., Ltd., CA1505N) with 10.4 g of 12 wt %-solution of PVdF in n-methylpyrolidone (NMP) (Kureha Co., Ltd., PVdF1120), 2 g acetylene black in a mixer. The above mixture was coated on 15 μm thick of aluminum foil substrate. The result was dried in an oven preset at 120° C. and pressed to a 70 μm thickness. Cathodes were cut from the result with dimensions of about 24.3 mm×361.0 mm.

The anodes were generated by mixing 44.85 g Mesocarbon Microbeads (Osaka Gas Co., Ltd., MCMB 25-28) and 1.15 g vapor grown carbon fiber (Showa Denko Co., Ltd. VGCF) with 30.77 g of a 13 wt % solution of PVdF in NMP (Kureha Co., Ltd., PVdF9130) in a mixer. The result was coated onto a 10 μm thickness of copper foil. The result was dried in an oven preset at 80° C. The dried result was then pressed to a 85 μm thickness. Anodes were cut from the result with dimensions of about 25.4 mm×387.0 mm.

Figure 2:
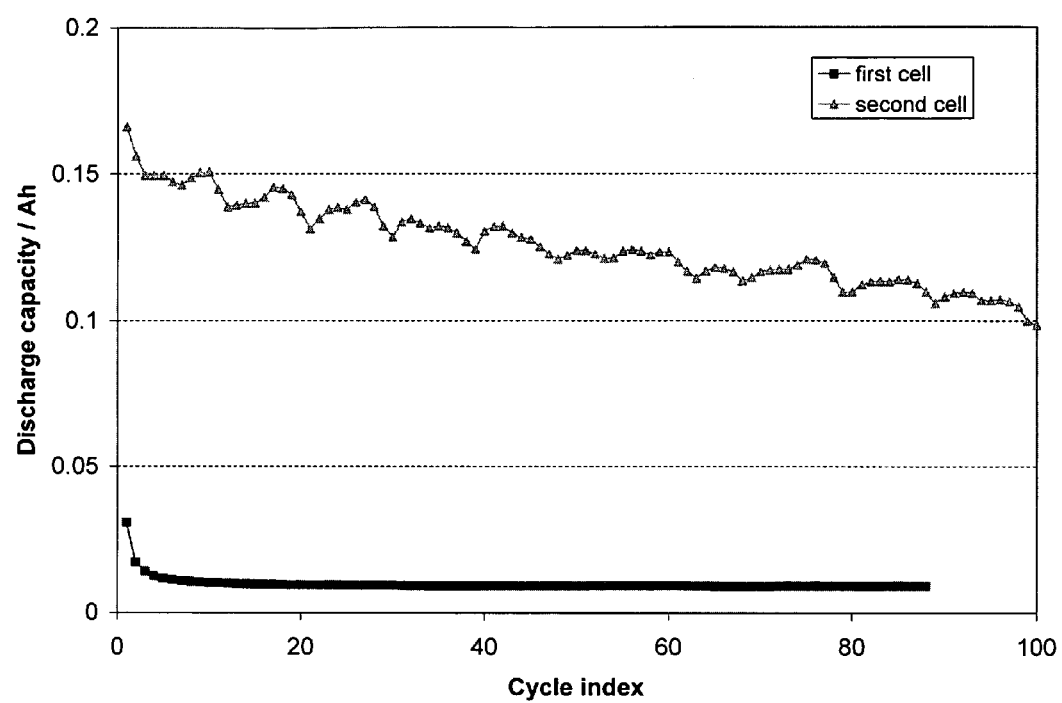
FIG. 2 compares the cycle performance of a battery that includes an electrolyte with a mixture of silanes against the cycle performance of a battery that includes an electrolyte with a single silane.

A variety of cells were generated with a structure according to FIG. 1. The cells had a separator made of 25 μm thick polyethylene. A first cell was generated with the first electrolyte, one of the anodes, one of the cathodes. A second cell was generated with the second electrolyte, one of the anodes, one of the cathodes. The cells were each repeatedly charged and discharged between 2.7 V and 4.2 V. During formation of a passive layer in the first six cycles, the cells were charged using constant current at a rate of C/20 followed by charging at constant voltage until the current falls to C/50. During the same six cycles, the cells were discharged at C/20. During the subsequent cycles, the cells were cycled between 3.0 V and 4.2 V using constant current at a rate of C/2 followed by charging at constant voltage until the current falls to C/50 and were discharged at C/2. The tests were carried out at 25° C. The results are displayed in FIG. 2. The cell that includes an electrolyte with a mixture of the first silane and the second silane (the second cell) shows an enhanced capacity relative to the cell that includes only the first silane.

Example 2

A third electrolyte was generated by dissolving $LiPF_6$ to 1.0 M in a silane represented by Formula VIII-D with n=3 and adding VC at 2 wt % of the solvent. A fourth electrolyte was generated by dissolving $LiPF_6$ to 1.0 M in a mixture having a silane represented by Formula VIII-D with n=3; ethylene carbonate, and diethyl carbonate at a mass ratio of 50:15:35 and adding VC at 2 wt % of the solvent. A fifth electrolyte was generated by dissolving LiPF$_6$ to 1.0 M in a mixture having a silane represented by Formula VIII-D with n=3, a silane represented by Formula VIII-J, ethylene carbonate, and diethyl carbonate at a mass ratio of 42:8:15:35 and adding VC at 2 wt % of the solvent.

Figure 3:
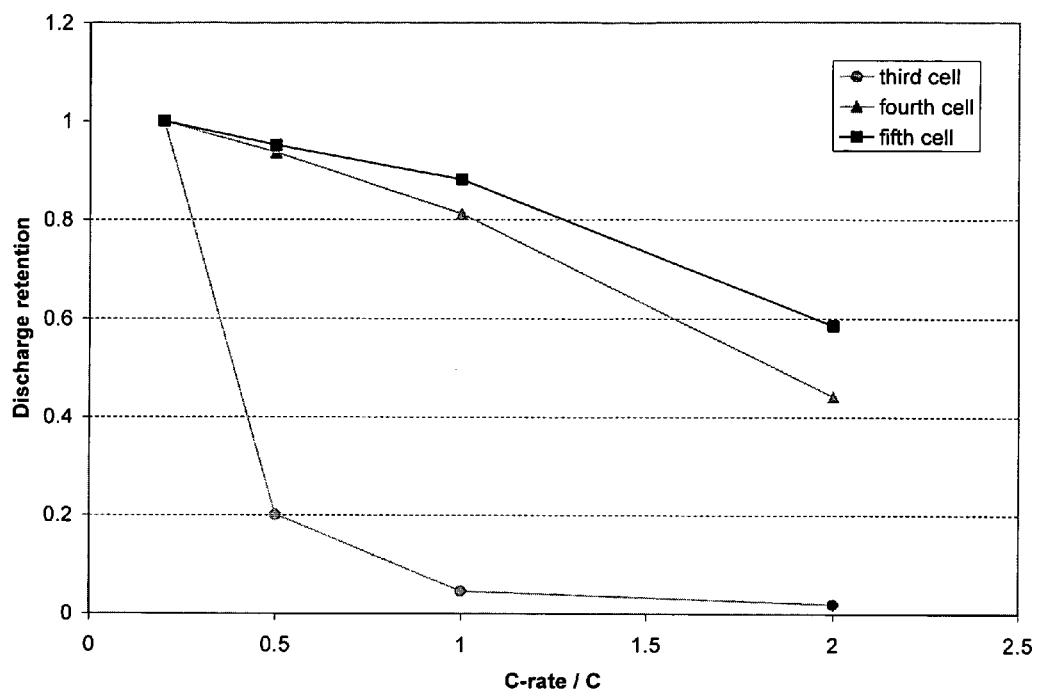
FIG. 3 compares the rate performance of a battery that includes an electrolyte with a mixture of silanes and organic solvents against the cycle performance of a battery that includes an electrolyte with a single silane and organic solvents.

A variety of cells were generated with a structure according to FIG. 1. The cells had a separator made of 25 µm thick polyethylene. A third cell was generated with the third electrolyte, an anode from Example 1, and a cathode from Example 1. A fourth cell was generated with the fourth electrolyte, an anode from Example 1, and a cathode from Example 1. A fifth cell was generated with the fifth electrolyte, an anode from Example 1, and a cathode from Example 1. The third cell, the fourth cell and the fifth cell were each repeatedly charged and discharged between 2.7 V and 4.2 V. During formation of a passive layer in the first six cycles, the cells were charged using constant current at a rate of C/20 followed by charging at constant voltage until the current falls to C/50. During the same six cycles, the cells were discharged at C/20. During the subsequent five cycles, the cells were cycled between 3.0 V and 4.2 V using constant current at a rate of C/2 followed by charging at constant voltage until the current falls to C/20. During the same five cycles, the cells were first discharged at a C/2 constant current for conditioning and then at C/5, C/2, 1C and 2 C for rate testing. The tests were carried out at 25° C. The results of the rate testing are provided in FIG. 3. The cell with a mixture of the first silane, the second silane, a linear carbonate and a cyclic carbonate shows the best rate performance. The third electrolyte showed the worst performance.

Example 3

Figure 4:
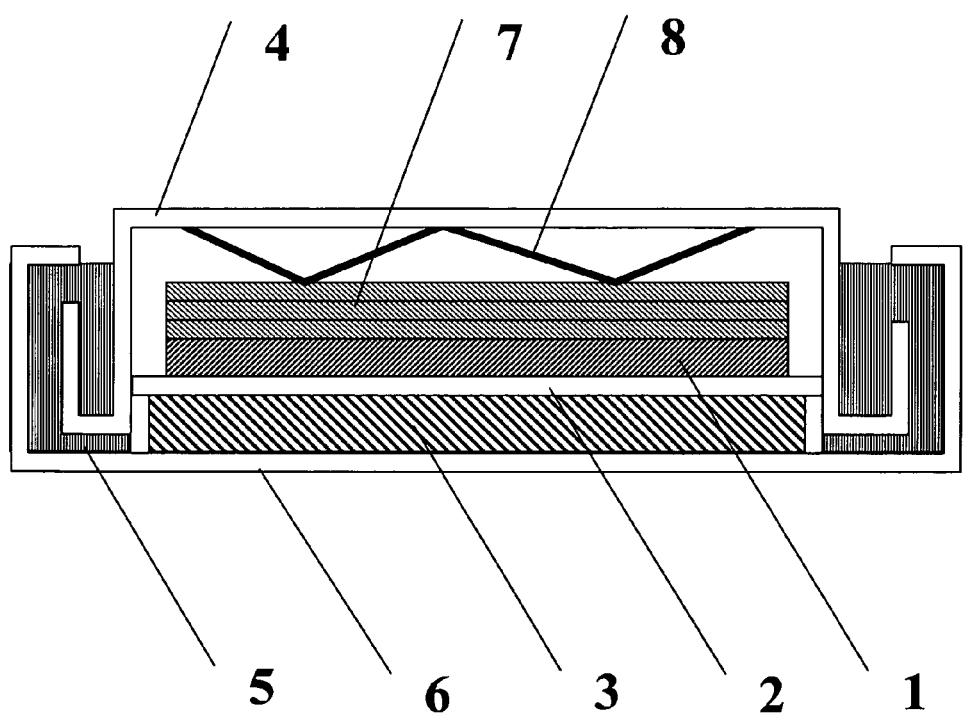
FIG. 4 is a cross section of a button cell.

A variety of 2032 type button cells were generated having a structure according to FIG. 4. The button cells include a separator 2 positioned between a cathode 1 and an anode 3. The anode and cathode are positioned in a chamber defined by a case 4, a gasket 5 and a cover 6. A spacer 7 and a spring washer 8 are positioned between the anode 3 and the case 4. The spacer 7 and spring washer 8 were made of stainless steel. The separator was a 25 µm thick polyethylene porous membrane (Tonen Co., Ltd.). An electrolyte positioned between the case 4 and the cover 6 activates the anode and the cathode.

A sixth electrolyte was generated by dissolving LiPF$_6$ to 1.0 M in a mixture having a silane represented by Formula VIII-D with n=3, a silane represented by Formula VIII-J, ethylene carbonate, and diethyl carbonate at a mass ratio of 25:25:15:35 and adding VC at 2 wt % of the solvent. A seventh electrolyte was generated by dissolving LiPF$_6$ to 1.0 M in a mixture having a silane represented by Formula VIII-D with n=3, a silane represented by Formula VIII-J, ethylene carbonate, and diethyl carbonate at a mass ratio of 8:42:15:35 and adding VC at 2 wt % of the solvent. An eighth electrolyte was generated by dissolving LiPF$_6$ to 1.0 M in a mixture having a silane represented by Formula VIII-J, ethylene carbonate, and diethyl carbonate at a mass ratio of 50:15:35 and adding VC at 2 wt % of the solvent.

A variety of cells were generated with a structure according to FIG. 4. The cells had a separator made of 25 µm thick polyethylene. A sixth cell was generated with the fourth electrolyte, an anode from Example 1, and a cathode from Example 1. A seventh cell was generated with the fifth electrolyte, an anode from Example 1, and a cathode from Example 1. An eighth cell was generated with the sixth electrolyte, an anode from Example 1, and a cathode from Example 1. A ninth cell was generated with the seventh electrolyte, an anode from Example 1, and a cathode from Example 1. A tenth cell was generated with the eighth electrolyte, an anode from Example 1, and a cathode from Example 1.

Figure 5:
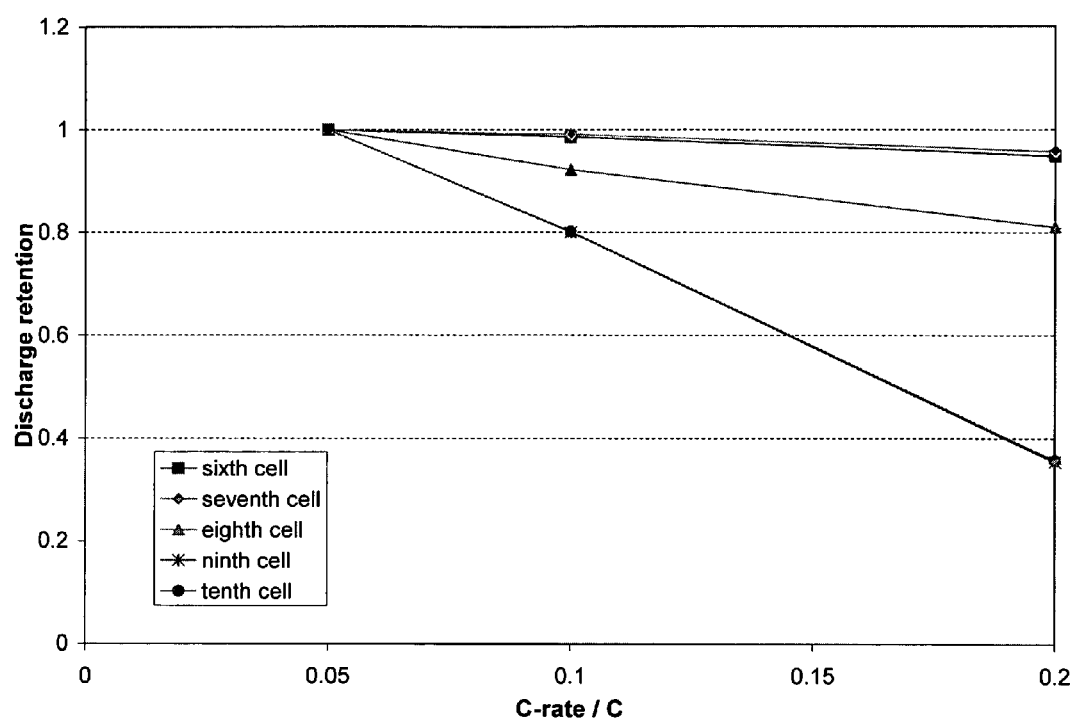
FIG. 5 compares the cycling performance of button cells having different ratio for mass of a first silane having a poly (ethylene oxide) moiety: mass of a second silane having a cyclic carbonate moiety.

The sixth cell, the seventh cell, the eighth cell, the ninth cell and the tenth cell were each repeatedly charged and discharged between 2.7 V and 4.2 V. During formation of a passive layer in the first six cycles, the cells were charged using constant current at a rate of C/20 followed by charging at constant voltage until the current falls to C/50. During the same six cycles, the cells were discharged at C/20. During the subsequent eight cycles, the cells were cycled between 3.0 V and 4.2 V using constant current at a rate of C/2 followed by charging at constant voltage until the current falls to C/20. During the same eight cycles, the cells were discharged at C/10 constant current for conditioning and then at C/20, C/10, and C/5 for rate testing. The tests were carried out at °25 C. The results of the rate testing are provided in FIG. 5. The sixth cell, the seventh cell, and the eighth cell each have a ratios of (mass of the first siloxane and/or first silane):(mass of the second siloxane and/or second silane) greater than 1:1, and each retain discharge capacity of more than 80% at C/5 against the discharge capacity at C/20.

Example 4

A ninth electrolyte was generated by dissolving LiPF$_6$ to 1.0 M in a mixture having a ethylene carbonate, and diethyl carbonate at a mass ratio of 30:70 and adding VC at 2 wt % of the solvent. A tenth electrolyte was generated by dissolving LiPF$_6$ to 1.0 M in a mixture having a silane represented by Formula VIII-D with n=3, a silane represented by Formula VIII-J, ethylene carbonate, and diethyl carbonate at a mass ratio of 25:5:21:49 and adding VC at 2 wt % of the solvent. An eleventh electrolyte was generated by dissolving LiPF$_6$ to 1.0 M in a mixture having a silane represented by Formula VIII-D with n=3, a silane represented by Formula VIII-J, ethylene carbonate, and diethyl carbonate at a mass ratio of 58:12:9:21 and adding VC at 2 wt % of the solvent. A twelfth electrolyte was generated by dissolving LiPF$_6$ to 1.0 M in a mixture having a silane represented by Formula VIII-D with n=3, and a silane represented by Formula VIII-J at a mass ratio of 83:17 and adding VC at 2 wt % of the solvent.

A variety of cells were generated with a structure according to FIG. 4. The cells had a separator made of 25 µm thick polyethylene. An eleventh cell was generated with the ninth electrolyte, an anode from Example 1, and a cathode from Example 1. A twelfth cell was generated with the tenth electrolyte, an anode from Example 1, and a cathode from Example 1. A thirteenth cell was generated with the eleventh electrolyte, an anode from Example 1, and a cathode from Example 1. A fourteenth cell was generated with the twelfth electrolyte, an anode from Example 1, and a cathode from Example 1.

Figure 6:
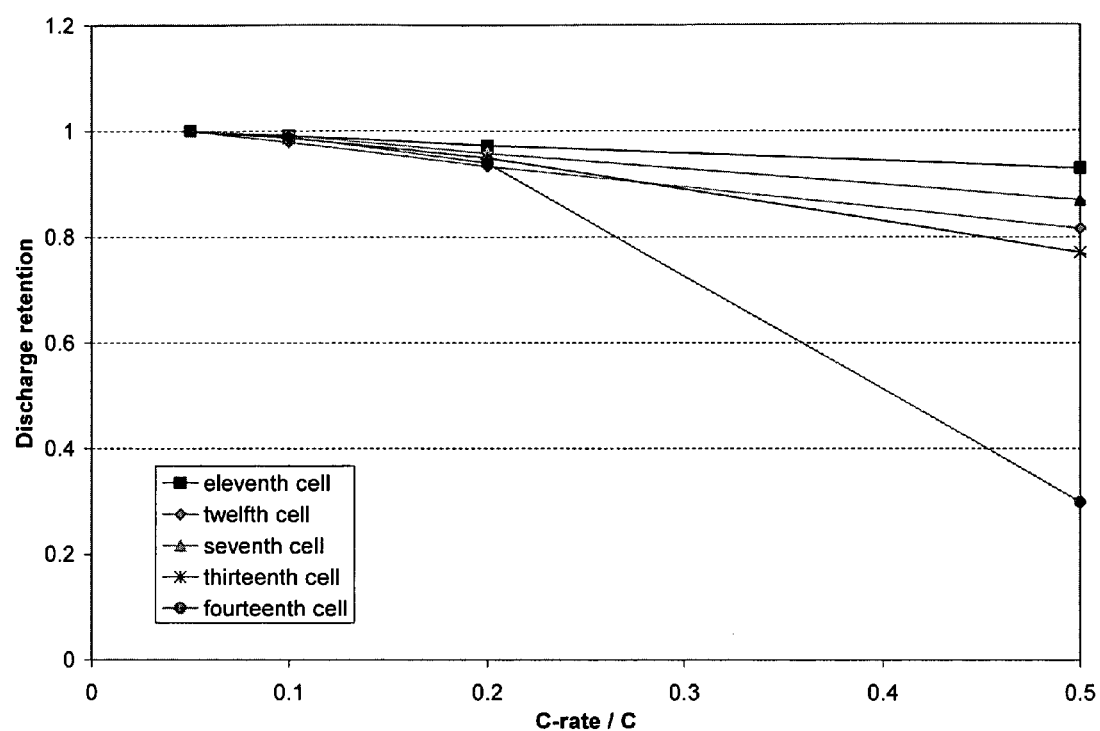
FIG. 6 compares the cycling performance of button cells having different ratios for mass of organic solvents: (mass of a first silane having a poly(ethylene oxide) moiety plus mass of a second silane having a cyclic carbonate moiety).

The seventh cell, the eleventh cell, the twelfth cell, the thirteenth cell and the fourteenth cell were each repeatedly charged and discharged between 2.7 V and 4.2 V. During formation of a passive layer in the first six cycles, the cells were charged using constant current at a rate of C/20 followed by charging at constant voltage until the current falls to C/50. During the same six cycles, the cells were discharged at C/20. During the subsequent eight cycles, the cells were cycled between 3.0 V and 4.2 V using constant current at a rate of C/2 followed by charging at constant voltage until the current falls to C/20. During the same eight cycles, the cells were discharged at C/10 constant current for conditioning and then at C/20, C/10, C/5, and C/2 for rate testing. The tests were carried out at 25° C. The results of the rate testing are provided in FIG. 6. The seventh cell, the eleventh cell, and the twelfth cell each have a ratio of organic solvent: (total mass of one or more first siloxanes, one or more first silanes, one or more second siloxanes, and one or more second silanes) greater than 1:1 and each retain a discharge capacity of more than 80% at C/2 against discharge capacity at C/20. Additionally, the seventh cell shows the best performance.

Example 5

A thirteenth electrolyte was generated by dissolving LiPF6 to 1.0 M in a mixture having a silane represented by Formula VIII-J, ethylene carbonate, and diethyl carbonate at a mass ratio of 20:24:56 and adding VC at 2 wt % of solvent.

A variety of cells were generated with a structure according to FIG. 1. The cells had a separator made of 25 μm thick polyethylene. A fifteenth cell was generated with the thirteenth electrolyte, an anode from Example 1, and a cathode form Example 1.

Figure 7:
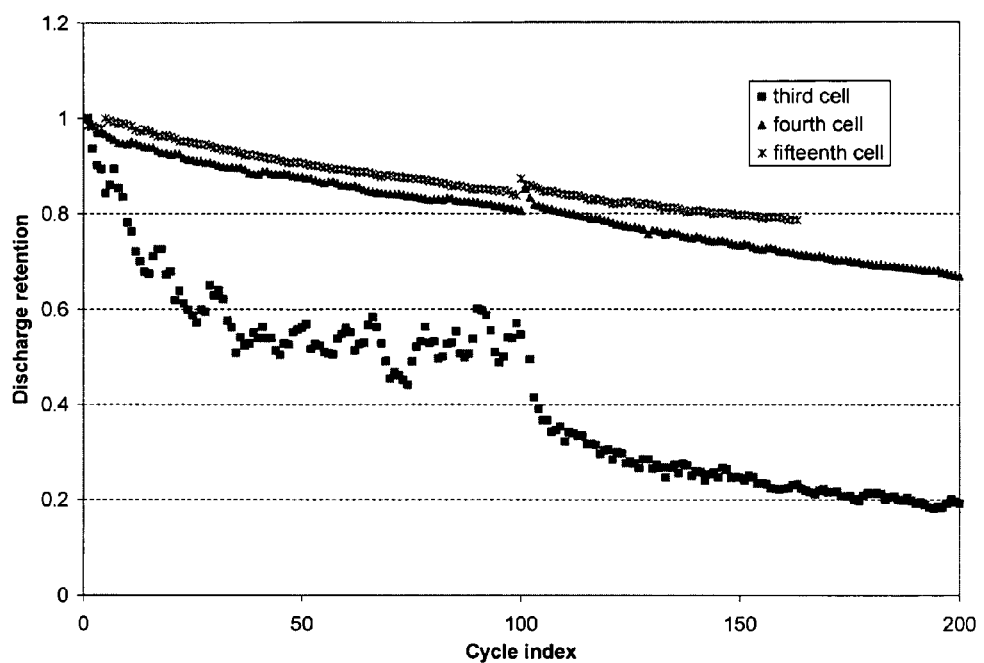
FIG. 7 compares the cycling performance of button cells having an electrolyte with a first silane having a poly(ethylene oxide) moiety against the cycling performance of a button cell having an electrolyte with a second silane having a cyclic carbonate moiety.

The third cell, fourth cell and fifteenth cell were each repeatedly charged and discharged between 2.7 V and 4.2 V. During formation of a passivation layer in the first six cycles, the cells were charged using constant current at a rate of C/20 followed by charging at constant voltage until the current falls to C/50. During the same six cycles, the cells were discharged at C/20. During the subsequent cycles, the cells were cycled between 3.0 V and 4.2 V using constant current at a rate of C/2 followed by charging at constant voltage until the current falls to C/50 and were discharged at C/2. The tests were carried out at 25° C. The results are displayed in FIG. 7. The fifteenth cell with the solvent excluding first silanes and including second silanes and organic solvents shows the best cycle performance.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:
1. A battery comprising:
an electrolyte activating one or more anodes and one or more cathodes, the electrolyte including one or more salts dissolved in a solvent, the solvent including
one or more first siloxanes and/or one or more first silanes, each of the first siloxanes and/or first silanes having one or more first substituents that each include a poly(alkylene oxide) moiety and each of the first siloxanes and/or first silanes excludes a cyclic carbonate moiety; and
one or more second siloxanes and/or one or more second silanes, each of the second siloxanes and/or second silanes having one or more second substituents that each include a carbonate moiety.

2. The battery of claim 1, wherein one or more of the first substituents is a noncrosslinking side-chain.

3. The battery of claim 2, wherein one or more of the first substituents is a crosslinking side-chain.

4. The battery of claim 1, wherein the carbonate moiety is a cyclic carbonate moiety.

5. The battery of claim 1, wherein the electrolyte further includes:
an organic solvent.

6. The battery of claim 5, wherein the organic solvent includes one or more components selected from the group consisting of: propylene carbonate (PC), ethylene carbonate (EC), butylene carbonate (BC), vinylene carbonate (VC), dimethyl carbonate (DMC), diethyl carbonate (DEC), ethylmethyl carbonate (EMC), dipropyl carbonate (DPC), dialkyl carbonates, 1,2-dimethoxyethane (DME), methyl propyl carbonate, ethyl propyl carbonate, methyl formate, methyl acetate, ethyl propionate, .gamma-butyrolactone, 1,2-ethoxyethane (DEE), ethoxymethoxyethane (EME), tetrahydrofuran and 2-methyltetrahydrofuran, dimethylsulfoxide, 1,3-dioxolane, formamide, acetoamide, dimethylformamide, dioxolane, acetonitrile, propylnitrile, nitromethane, ethylmonoglyme, triester phosphate, trimethoxymethane, sulphorane, methylsulphorane, 1,3-diemthyl-2-imidazoline, 3-methyl-2-oxazolidinone, ethylether, 1,3-propanesultone, anisole, and N-methylpyrrolidone.

7. The battery of claim 5, wherein the organic solvent includes one or more cyclic carbonates.

8. The battery of claim 5, wherein the organic solvent includes one or more cyclic carbonate and one or more linear carbonates.

9. The battery of claim 1, wherein one or more salts includes a salt selected from the group consisting of $LiClO_4$, $LiBF_4$, $LiAsF_6$, $LiPF_6$, $LiSbF_6$, $LiCF_3SO_3$, $LiC_6F_5SO_3$, $LiC_4F_9CO_2$, $LiC(CF_3SO_2)_3$, $LiN(SO_2C_2FO_2)$, $LiN(SO_2CF_3)_2$, $LiAlCl_4$, $LiGaCl_4$, $LiSCN$, $LiO_2$, $LiO_3SCF_3$, $LiO_2CCF_3$, $LiSO_6F$, $LiB(C_6H_5)_4$, chloroboran lithium, lithium tetraphenylborate, LiBr, Lit, LiSCN, LiCl, imides, Li-methide, Li-imide, lithium alkyl fluorophosphates and mixtures thereof.

10. The battery of claim 1, wherein the one or more salts includes a bis[bidentate] borate.

11. The battery of claim 1, wherein the one or more salts includes one or more salts according to:

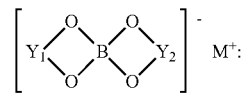

wherein M⁺ is a metal ion selected from the Group I or Group II elements; $Y_1$ and $Y_2$ are each selected from a group consisting of: —$CX(CR_2)_aCX$—, —$CZZ'(CR_2)_nCZZ'$—, —$CX(CR_2)_5CZZ'$—, —$SO_2(CR_2)_bSO_2$—, and —$CO(CR_2)_b SO_2$—; X is O or Z is alkyl, halogenated alkyl, —C=NR', $CR'_3$ or R; V is alkyl, halogenated alkyl, —C=NR'; $CR'_3$ or R'; R' is halogen or hydrogen; R is hydrogen, alkyl, halogenated alkyl, cyano, or halogen; a is 0 to 4 and b is 1 to 4.

12. The battery of claim 1, wherein the one or more salts includes lithium bis-oxalato borate (LiBOB).

13. The battery of claim 1, wherein the solvent includes the one or more second silanes and one of the second silanes is represented by: $SiR_{4-x-y}R'_xR''_y$: wherein R is an alkyl group, an aryl group or a halogen, $R'_x$ is represented by Formula VIII-A or Formula VIII-C, $R''_y$ is represented by Formula VW-B, x is 0 to 4, y is 0 to 4, 4-x-y indicates the number of R substituents, and x+y is at least 1;

Formula VIII-A:

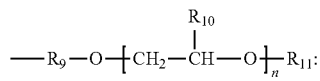

wherein $R_9$ is nil or an organic spacer, $R_{10}$ is hydrogen; alkyl or aryl; $R_{11}$ is alkyl or aryl; and n is 1 to 15;

Formula VIII-B:

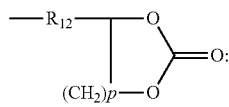

wherein $R_{12}$ is an organic spacer and p is 1 to 2; and
Formula VIII-C:

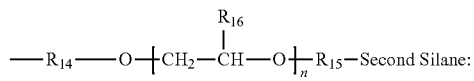

where $R_{14}$ is nil or a spacer; $R_{15}$ is nil or a spacer, $R_{16}$ is hydrogen, alkyl or aryl; second silane represents another silane and n is 1 to 15.

14. The battery of claim 13, wherein x is greater than 0 to 4.

15. The battery of claim 13, wherein $R_9$ is nil and $R_{14}$ is nil.

16. The battery of claim 13, wherein $R'_x$ is represented by Formula VW-A.

17. The battery of claim 16, wherein $R_9$ is nil.

18. The battery of claim 17, wherein the first silane is represented by Formula VIII-D:

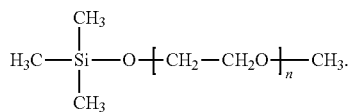

19. The battery of claim 1, wherein the solvent includes one or more additives.

20. The battery of claim 19, wherein the one or more of the additives is selected from a group consisting of vinyl carbonate (VC), vinyl ethylene carbonate (VEC), ethylene sulfite (ES), propylene sulfite (PS), and phenyl ethylene carbonate, (PhEC).

21. The battery of claim 19, wherein the one or more of the additives is selected from a group consisting of vinyl carbonate (VC), and vinyl ethylene carbonate (VEC).

22. The battery of claim 1, wherein the poly(alkylene oxide) moiety includes an oxygen linked directly to a silicon in the one or more first siloxanes and/or the one or more first silanes.

23. The battery of claim 1, wherein the solvent includes the one or more first silanes or the one or more second silanes.

24. The battery of claim 1, wherein the solvent includes one or more components selected from the group consisting of the first siloxanes and the second siloxanes, wherein the one or more components are each a disiloxane.

25. The battery of claim 1, wherein the one or more salts includes a dihalo mono[bidentate] borate.

26. The battery of claim 1, wherein the one or more salts includes one or more salts according to:

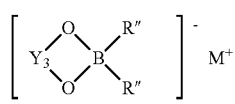

wherein $M^+$ is a metal ion selected from the Group I or Group II elements; $Y_3$ is selected from a group consisting of —CX$(CR_2)_a$CX—, —CZZ'$(CR_2)_a$CZZ'—, —CX$(CR_2)_a$CZZ'—, —SO$_2$$(CR_2)_b$SO$_2$—, and —CO$(CR_2)_b$SO$_2$—; X is =O or =NR', Z is alkyl, halogenated alkyl, —C=NR', CR'$_3$, or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4.

27. The battery of claim 1, wherein the one or more salts includes lithium difluoro oxalatoborate (LiDfOB).

28. The battery of claim 1, wherein the solvent includes the one or more second siloxanes and one or more of the second siloxanes is represented by:

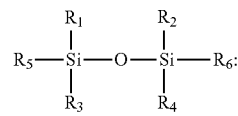

wherein $R_1$ is an alkyl group or an aryl group; $R_2$ is an alkyl group or an aryl group; $R_3$ is an alkyl group or an aryl group; $R_4$ is an alkyl group or an aryl group; $R_5$ is represented by Formula VII-A, Formula VII-B or Formula VII-C; $R_6$ is an alkyl group, an aryl group, represented by Formula VII-D, or represented by Formula VII-E;

Formula VII-A:

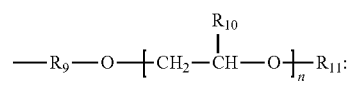

wherein $R_9$ is nil or a spacer; $R_{10}$ is hydrogen; alkyl or aryl; $R_{11}$ is alkyl or aryl; and n is 1 to 12;

Formula VII-B:

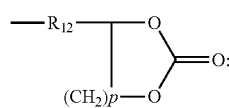

wherein $R_{12}$ is an organic spacer and p is 1 to 2;
Formula VII-C:

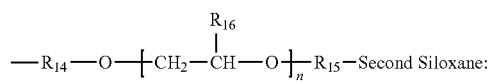

where $R_{14}$ is nil or a spacer, $R_{15}$ is nil or a spacer; $R_{16}$ is hydrogen, alkyl or aryl; second siloxane represents another siloxane and n is 1 to 12;

Formula VII-D:

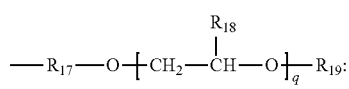

wherein $R_{17}$ is nil or a spacer; $R_{18}$ is hydrogen; alkyl or aryl; $R_{19}$ is alkyl or aryl; and q is 1 to 12; and Formula VII-E:

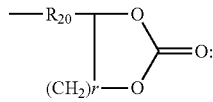

wherein $R_{20}$ is an organic spacer and p is 1 to 2.

29. The battery of claim 1, wherein the solvent includes the one or more second siloxanes and one or more of the second siloxanes is represented by:

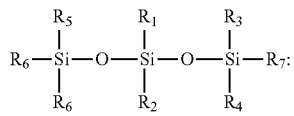

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D;
Formula V-A:

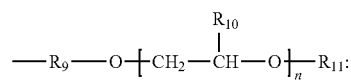

wherein $R_9$ is nil or a spacer; $R_{10}$ is hydrogen; alkyl or aryl; $R_{11}$ is alkyl or aryl; and n is 1 to 12;
Formula V-B:

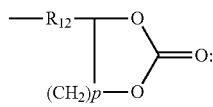

wherein $R_{12}$ is an organic spacer and p is 1 to 2;
Formula V-C:

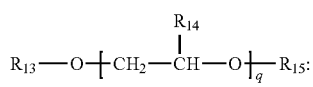

wherein $R_{13}$ is nil or a spacer; $R_{14}$ is hydrogen; alkyl or aryl; $R_{15}$ is alkyl or aryl; and q is 1 to 12; and Formula V-D:

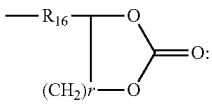

wherein $R_{16}$ is an organic spacer and p is 1 to 2.

30. The battery of claim 1, wherein the solvent includes the one or more second siloxanes and one or more of the second siloxanes is represented by

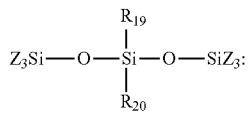

wherein $R_{19}$ is an alkyl group or an aryl group; $R_{20}$ is represented by Formula VI-A, Formula VI-B or Formula VI-C;
Formula VI-A:

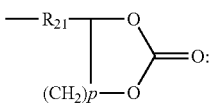

wherein $R_{21}$ is an organic spacer and p is 1 to 2;
Formula VI-B:

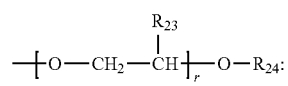

wherein $R_{23}$ is hydrogen; alkyl or aryl; $R_{24}$ is alkyl or aryl; and r is 1 to 12; and
Formula VI-C:

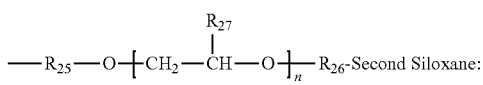

where $R_{25}$ is nil or a spacer; $R_{26}$ is nil or a spacer; $R_{27}$ is hydrogen, alkyl or aryl; second siloxane represents another siloxane and n is 1 to 12.

31. The battery of claim 1, wherein the solvent includes the one or more first siloxane and one or more of the first siloxanes is represented by:

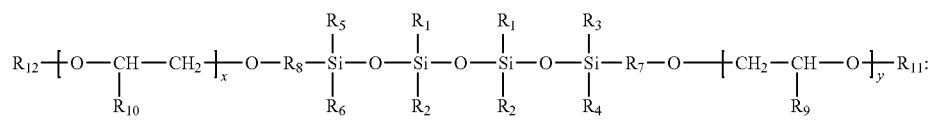

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is nil ora spacer, $R_8$ is nil or a spacer, $R_9$ is a hydrogen, an alkyl group or an aryl group; $R_{10}$ is a hydrogen, an alkyl group or an aryl group; $R_{11}$ is an alkyl group or an aryl group; and $R_{12}$ is an alkyl group or an aryl group; x is 1 or greater and/or 12 or less and y is 1 or greater and/or 12 or less.

32. The battery of claim 1, wherein the solvent includes the one or more second siloxanes and one or more of the second siloxanes is represented by

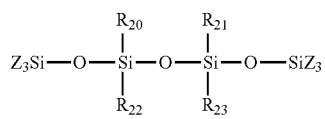

wherein: $R_{20}$ is an alkyl group or an aryl group; $R_{21}$ is an alkyl group or an aryl group; $R_{22}$ is represented by Formula IV-A; $R_{23}$ is represented by Formula IV-B or IV-C and each Z is an alkyl or an aryl group;

Formula IV-A:

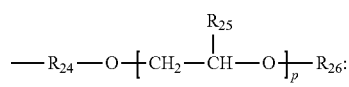

wherein $R_{24}$ is an organic spacer or nil; $R_{25}$ is hydrogen, alkyl or aryl; $R_{25}$ is alkyl or aryl and p is 1 or more and/or 12 or less;

Formula IV-B:

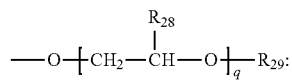

wherein $R_{28}$ is hydrogen, alkyl or aryl; $R_{29}$ is alkyl or aryl; q is 1 or more and/or 12 or less; and Formula IV-C:

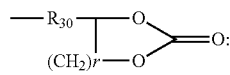

wherein $R_{30}$ is an organic spacer and r is 1 or 2.

33. The battery of claim 1, wherein the solvent includes one or more of the first siloxanes and at least one of the first siloxanes is a tetrasiloxane, a trisiloxane or a disiloxane.

34. The battery of claim 1, wherein the solvent includes one or more of the first siloxanes and at least one of the first siloxanes is a disiloxane.

35. The battery of claim 1, wherein the solvent includes one or more of the second siloxanes and at least one of the second siloxanes is a tetrasiloxane, a trisiloxane or a disiloxane.

36. The battery of claim 1, wherein the solvent includes one or more of the second siloxanes and at least one of the second siloxanes is a disiloxane.

37. The battery of claim 1, wherein the solvent includes one or more of the first siloxanes and at least one of the first siloxanes is a tetrasiloxane, a trisiloxane or a disiloxanes; and wherein the solvent includes one or more of the second siloxanes and at least one of the second siloxanes is a tetrasiloxane, a trisiloxane or a disiloxane.

38. The battery of claim 1 where each of the one or more first siloxanes and/or one or more first silanes is a separate compound from each of the one or more second siloxanes and/or one or more second silanes.

39. A battery comprising:
an electrolyte activating one or more anodes and one or more cathodes, the electrolyte including one or more salts dissolved in a solvent, the solvent including
one or more first silanes, each of the first silanes having one or more first substituents that each include a poly (alkylene oxide) moiety and each of the first silanes excludes a cyclic carbonate moiety; and
one or more second silanes, each of the second silanes having one or more second substituents that each include a carbonate moiety.

40. The battery of claim 39, wherein one or more of the first substituents is a noncrosslinking side-chain.

41. The battery of claim 39, wherein the carbonate moiety is a cyclic carbonate moiety.

42. The battery of claim 39, wherein one or more salts includes one or more organoborate salts.

43. The battery of claim 39, wherein one of the second silanes is represented by: $SiR_{4-x-y}R'_xR''_y$: wherein R is an alkyl group, an aryl group or a halogen, $R'_x$ is represented by Formula VIII-A or Formula VIII-C, $R''_y$ is represented by Formula VIII-B, x is 0 to 4, y is 0 to 4, 4-x-y indicates the number of R substituents, and x+y is at least 1;

Formula VIII-A:

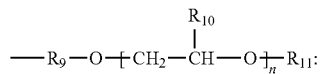

wherein $R_9$ is nil or an organic spacer; $R_{10}$ is hydrogen; alkyl or aryl; $R_{11}$ is alkyl or aryl; and n is 1 to 15;

Formula VIII-B:

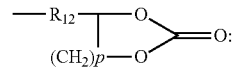

wherein $R_{14}$ is an organic spacer and p is 1 to 2; and

Formula VIII-C:

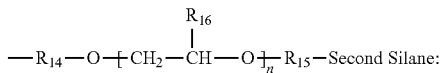

where $R_{14}$ is nil or a spacer, $R_{15}$ is nil or a spacer; $R_{16}$ is hydrogen, alkyl or aryl; second silane represents another silane and n is 1 to 15.

44. The battery of claim 43, wherein x is greater than 0 and up to 4.

45. The battery of claim 43, wherein $R_9$ is nil and $R_{14}$ is nil.

46. The battery of claim 43, wherein $R'_x$ is represented by Formula VIII-A.

47. The battery of claim 46, wherein $R_9$ is nil.

48. The battery of claim 39, wherein the solvent includes one or more additives selected from a group consisting of o-phenylene carbonate, vinyl carbonate (VC), vinyl ethylene carbonate (VEC), ethylene sulfite (ES), propylene sulfite (PS), 1,3 dimethyl butadiene, styrene carbonate, an aromatic carbonate, vinyl pyrrole, vinyl piperazine, vinyl piperidine, and vinyl pyridine.

49. The battery of claim 39, wherein the poly(alkylene oxide) moiety includes an oxygen linked directly to a silicon in the one or more first silanes.

50. The battery of claim 39, wherein at least one of the one or more first silanes is represented by Formula VIII-D:

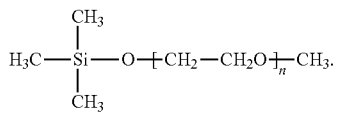

51. A battery comprising:
an electrolyte activating one or more anodes and one or more cathodes, the electrolyte including one or more salts dissolved in a solvent;
the one or more salts including one or more organoborate salts;
the solvent including
one or more first siloxanes and/or one or more first silanes, each of the first siloxanes and/or first silanes having one or more first substituents that each include a poly(alkylene oxide) moiety and each of the first siloxanes and/or first silanes excludes a cyclic carbonate moiety, and
one or more second siloxanes and/or one or more second silanes, each of the second siloxanes and/or second silanes having one or more second substituents that each include a carbonate moiety.

52. The battery of claim 51, wherein one or more of the first substituents is a noncrosslinking side-chain.

53. The battery of claim 51, wherein the carbonate moiety is a cyclic carbonate moiety.

54. The battery of claim 51, wherein the one or more organoborate salts includes a bis[bidentate] borate.

55. The battery of claim 51, wherein the one or more organoborate salts includes one or more salts according to:

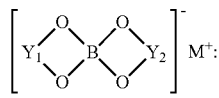

wherein $M^+$ is a metal ion selected from the Group I or Group II elements; $Y_1$ and $Y_2$ are each selected from a group consisting of: $-CX(CR_2)_aCX-$, $-CZZ'(CR_2)_aCZZ'-$, $-CX(CR_2)_aCZZ'-$, $-SO_2(CR_2)_bSO_2-$, and $-CO(CR_2)_bSO_2-$; X is $=O$ or $=NR'$, Z is alkyl, halogenated alkyl, $-C=NR'$, $CR'_3$ or R'; Z' is alkyl, halogenated alkyl, $-C=NR'$, $CR'_3$ or R; R' is halogen or hydrogen; R is hydrogen, alkyl, halogenated alkyl, cyano, or halogen; a is 0 to 4 and b is 1 to 4.

56. The battery of claim 51, wherein the one or more organoborate salts includes lithium bis-oxalato borate (LiBOB).

57. The battery of claim 51, wherein the solvent includes the one or more second silanes and one of the second silanes is represented by: $SiR_{4-x-y}R'_xR''_y$:
wherein R is an alkyl group, an aryl group or a halogen, $R'_x$ is represented by Formula VIII-A or Formula VIII-C, $R''_y$ is represented by Formula x is 0 to 4, y is 0 to 4, 4-x-y indicates the number of R substituents, and x+y is at least 1;
Formula VIII-A:

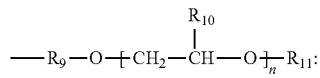

wherein $R_9$ is nil or an organic spacer; $R_{10}$ is hydrogen; alkyl or aryl; $R_{11}$ is alkyl or aryl; and n is 1 to 15;
Formula VIII-B:

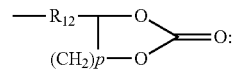

wherein $R_{12}$ is an organic spacer and p is 1 to 2; and
Formula VIII-C:

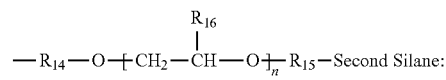

where $R_{14}$ is nil or a spacer; $R_{15}$ is nil or a spacer; $R_{16}$ is hydrogen, alkyl or aryl; second silane represents another silane and n is 1 to 15.

58. The battery of claim 57, wherein the first silane is represented by Formula VIII-D:

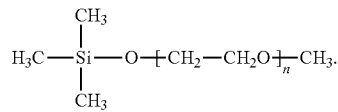

59. The battery of claim 51, wherein the solvent includes one or more additives selected from a group consisting of o-phenylene carbonate, vinyl carbonate (VC), vinyl ethylene carbonate (VEC), ethylene sulfite (ES), propylene sulfite (PS), 1,3 dimethyl butadiene, styrene carbonate, an aromatic carbonate, vinyl pyrrole, vinyl piperazine, vinyl piperidine, and vinyl pyridine.

60. The battery of claim 51, wherein the poly(alkylene oxide) moiety includes an oxygen linked directly to a silicon in the one or more first siloxanes and/or the one or more first silanes.

61. The battery of claim 51, wherein the solvent includes one or more components selected from the group consisting of the first siloxanes and the second siloxanes; wherein the one or more components are each a disiloxane.

62. The battery of claim 51, wherein the one or more organoborate salts includes a dihalo mono[bidentate] borate.

63. The battery of claim 51, wherein the one or more organoborate salts includes one or more salts according to:

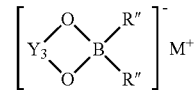

wherein M$^+$ is a metal ion selected from the Group I or Group II elements; Y$_3$ is selected from a group consisting of —CX(CR$_2$)$_n$CX—, —CZZ'(CR$_2$)$_n$CZZ'—, —CX(CR$_2$)$_a$CZZ'—, —SO$_2$(CR$_2$)SO$_2$—, and —CO(CR$_2$)$_b$SO$_2$—; X is =O or =NR', Z is alkyl, halogenated alkyl, —C=NR', CR'$_3$, or R'; Z' is alkyl, halogenated alkyl, —C=NR', CR'$_3$ or R'; R" is a halogen; R' is halogen or hydrogen; R is hydrogen, alkyl, halogenated alkyl, cyano, or halogen; a is 0 to 4 and b is 1 to 4.

64. The battery of claim 51, wherein the one or more organoborate salts includes lithium difluoro oxalatoborate (LiDfOB).

65. The battery of claim 51, wherein the solvent includes the one or more second siloxanes and one or more of the second siloxanes is represented by:

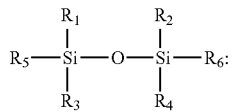

wherein R$_1$ is an alkyl group or an aryl group; R$_2$ is an alkyl group or an aryl group; R$_3$ is an alkyl group or an aryl group; R$_4$ is an alkyl group or an aryl group; R$_5$ is represented by Formula Formula VII-B or Formula VII-C; R$_6$ is an alkyl group, an aryl group, represented by Formula VII-D, or represented by. Formula VII-E;

Formula VII-A:

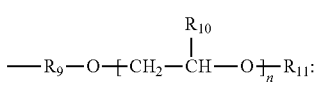

wherein R$_9$ is nil of a spacer; R$_{10}$ is hydrogen; alkyl or aryl; R$_{11}$ is alkyl or aryl; and n is 1 to 12;

Formula VII-B:

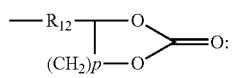

wherein R$_{12}$ is an organic spacer and p is 1 to 2;

Formula VII-C:

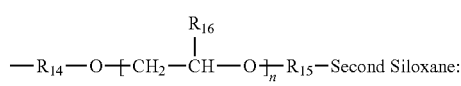

where R$_{14}$ is nil or a spacer; R$_{15}$ is nil or a spacer, R$_{16}$ is hydrogen, alkyl or aryl; second siloxane represents another siloxane and n is 1 to 12;

Formula VII-D:

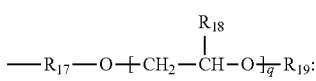

wherein R$_{17}$ is nil or a spacer; R$_{18}$ is hydrogen; alkyl or aryl; R$_{19}$ is alkyl or aryl; and q is 1 to 12; and Formula VII-E:

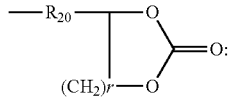

wherein R$_{20}$ is an organic spacer and p is 1 to 2.

66. The battery of claim 51, wherein the solvent includes the one or more second siloxanes and one or more of the second siloxanes is represented by:

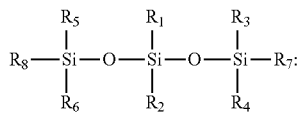

wherein R$_1$ is an alkyl group; R$_2$ is an alkyl group; R$_3$ is an alkyl group or an aryl group; R$_4$ is an alkyl group or an aryl group; R$_5$ is an alkyl group or an aryl group; R$_6$ is an alkyl group or an aryl group; R$_7$ is represented by Formula V-A or Formula V-B; R$_8$ is represented by Formula V-C or Formula V-D;

Formula V-A:

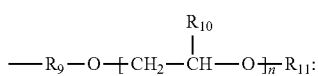

wherein R$_9$ is nil or a spacer; R$_{10}$ is hydrogen; alkyl or aryl; R$_{11}$ is alkyl or aryl; and n is 1 to 12;

Formula V-B:

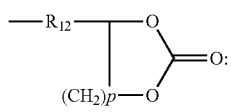

wherein R$_{12}$ is an organic spacer and p is 1 to 2;

Formula V-C

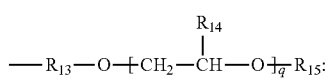

wherein R$_{13}$ is nil or a spacer, R$_{14}$ is hydrogen; alkyl or aryl; R$_{15}$ is alkyl or aryl; and q is 1 to 12; and Formula V-D:

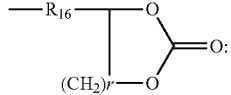

wherein R$_{16}$ is an organic spacer and p is 1 to 2.

67. The battery of claim 51, wherein the solvent includes the one or more second siloxanes and one or more of the second siloxanes is represented by:

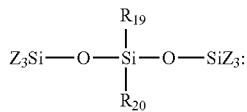

wherein $R_{19}$ is an alkyl group or an aryl group; $R_{20}$ is represented by Formula VI-A, Formula VI-B or Formula VI-C;

Formula VI-A:

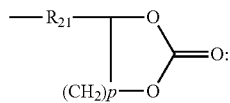

wherein $R_{21}$ is an organic spacer and p is 1 to 2;

Formula VI-B:

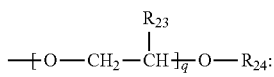

wherein $R_{23}$ is hydrogen; alkyl or aryl; $R_{24}$ is alkyl or aryl; and r is 1 to 12; and Formula VI-C:

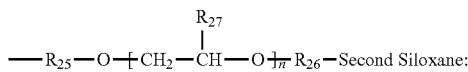

where $R_{25}$ is nil or a sPacer; $R_{26}$ is nil or a spacer; $R_{27}$ is hydrogen, alkyl or aryl; second siloxane represents another siloxane and n is 1 to 12.

68. The battery of claim 51, wherein the solvent includes the one or more first siloxane and one or more of the first siloxanes is represented by:

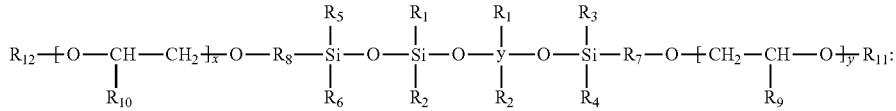

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is nil or a spacer; $R_8$ is nil or a spacer; $R_9$ is a hydrogen, an alkyl group or an aryl group; $R_{10}$ is a hydrogen, an alkyl group or an aryl group; $R_{11}$ is an alkyl group or an aryl group; and $R_{12}$ is an alkyl group or an aryl group; x is 1 or greater and/or 12 or less and y is 1 or greater and/or 12 or less.

69. The battery of claim 51, wherein the solvent includes the one or more second siloxanes and one or more of the second siloxanes is represented by:

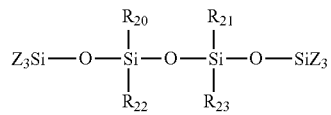

wherein: $R_{20}$ is an alkyl group or an aryl group; $R_{21}$ is an alkyl group or an aryl group; $R_{22}$ is represented by Formula IV-A; $R_{23}$ is represented by Formula IV-B or IV-C and each Z is an alkyl or an aryl group;

Formula IV-A:

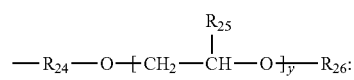

wherein $R_{24}$ is an organic spacer or nil; $R_{25}$ is hydrogen, alkyl or aryl; $R_{26}$ is alkyl or aryl and p is 1 or more and/or 12 or less;

Formula IV-B:

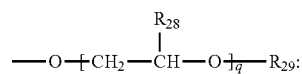

wherein $R_{28}$ is hydrogen, alkyl or aryl; $R_{29}$ is alkyl or aryl; q is 1 or more and/or 12 or less; and Formula IV-C:

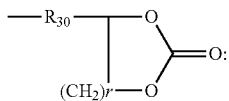

wherein $R_{30}$ is an organic spacer and r is 1 or 2.

70. The battery of claim 51, wherein the solvent includes one or more of the first siloxanes and at least one of the first siloxanes is a tetrasiloxane, a trisiloxane or a disiloxane.

71. The battery of claim 51, wherein the solvent includes one or more of the second siloxanes and at least one of the second siloxanes is a teirasiloxane, a trisiloxane or a disiloxane.

72. A battery comprising:
an electrolyte activating one or more anodes and one or more cathodes, the electrolyte including one or more salts dissolved in a solvent;
the solvent including
one or more first siloxanes and/or one or more first silanes, each of the first siloxanes and/or first silanes having one or more first substituents that each include a poly(alkylene oxide) moiety and each of the first siloxanes and/or first silanes excludes a cyclic carbonate moiety, and one or more second siloxanes and/or one or more second silanes, each of the second siloxanes and/or second silanes having one or more second substituents that each include a carbonate moiety, and one or more additives selected from a group consisting of o-phenylene carbonate, vinyl carbonate (VC), vinyl ethylene carbonate (VEC), ethylene sulfite (ES), propylene sulfite (PS), 1,3 dimethyl butadiene, styrene carbonate, an aromatic carbonate, vinyl pyrrole, vinyl piperazine, vinyl piperidine, and vinyl pyridine.

73. The battery of claim 72, wherein the one or more of the additives is selected from a group consisting of vinyl carbonate (VC), vinyl ethylene carbonate (VEC), ethylene sulfite (ES), propylene sulfite (PS), and phenyl ethylene carbonate (PhEC).

74. The battery of claim 72, wherein the one or more of the additives is selected from a group consisting of vinyl carbonate (VC), and vinyl ethylene carbonate (VEC).

75. The battery of claim 72, wherein one or more of the first substituents is a noncrosslinking side-chain.

76. The battery of claim 72, wherein the carbonate moiety is a cyclic carbonate moiety.

77. The battery of claim 72, wherein the poly(alkylene oxide) moiety includes an oxygen linked directly to a silicon in the one or more first siloxanes and/or the one or more first silanes.

78. The battery of claim 72, wherein the solvent includes one or more components selected from the group, consisting of the first siloxanes and the second siloxanes, wherein the one or more components are each a disiloxane.

79. The battery of claim 72, wherein the solvent includes the one or more second siloxanes and one or more of the second siloxanes is represented by:

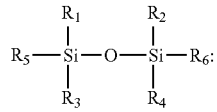

wherein $R_1$ is an alkyl group or an aryl group; $R_2$ is an alkyl group or an aryl group; $R_3$ is an alkyl group or an aryl group; $R_4$ is an alkyl group or an aryl group; $R_5$ is represented by Formula VII-A, Formula VII-B or Formula VII-C; $R_6$ is an alkyl group, an aryl group, represented by Formula VII-D, or represented by Formula VII-E;

Formula VII-A:

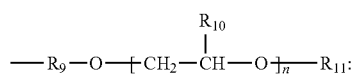

wherein $R_9$ is nil or a spacer; $R_{14}$ is hydrogen; alkyl or aryl; $R_{11}$ is alkyl or aryl; and n is 1 to 12;

Formula VII-B:

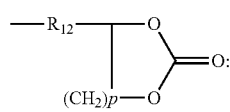

wherein $R_{12}$ is an organic spacer and p is 1 to 2;

Formula VII-C:

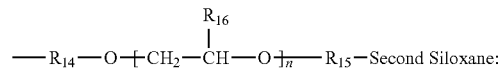

where $R_{14}$ is nil or a spacer; $R_{15}$ is nil or a spacer; $R_{16}$ is hydrogen, alkyl or aryl; second siloxane represents another siloxane and n is 1 to 12;

Formula VII-D:

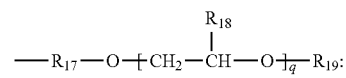

wherein $R_{17}$ is nil or a spacer; $R_{18}$ is hydrogen; alkyl or aryl; $R_{19}$ is alkyl or aryl; and q is 1 to 12; and Formula VII-E:

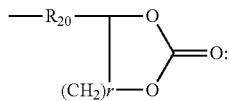

wherein $R_{20}$ is an organic spacer and p is 1 to 2.

80. The battery of claim 72, wherein the solvent includes the one or more second siloxanes and one or more of the second siloxanes is represented by:

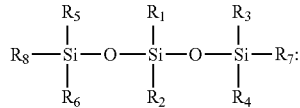

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D;

Formula V-A:

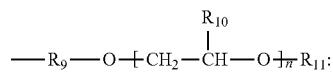

wherein $R_9$ is nil or a spacer, $R_{10}$ is hydrogen; alkyl or aryl; $R_{11}$ is alkyl or aryl; and n is 1 to 12;

Formula V-B:

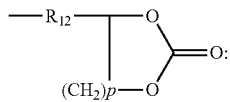

wherein $R_{12}$ is an organic spacer and p is 1 to 2;

Formula V-C:

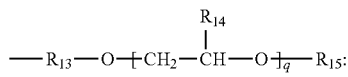

wherein $R_{13}$ is nil or a spacer; $R_{14}$ is hydrogen; alkyl or aryl; $R_{15}$ is alkyl or aryl; and q is 1 to 12; and Formula V-D:

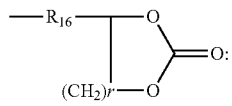

wherein $R_{16}$ is an organic spacer and p is 1 to 2.

81. The battery of claim 72, wherein the solvent includes the one or more second siloxanes and one or more of the second siloxanes is represented by

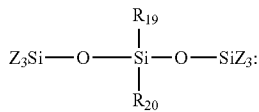

wherein $R_{19}$ is an alkyl group or an aryl group; $R_{20}$ is represented by Formula VI-A, Formula VI-B or Formula VI-C;

Formula VI-A:

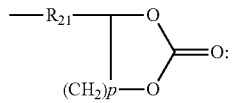

wherein $R_{21}$ is an organic spacer and p is 1 to 2;

Formula VI-B:

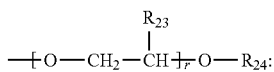

wherein $R_{23}$ is hydrogen; alkyl or aryl; $R_{24}$ is alkyl or aryl; and r is 1 to 12; and Formula VI-C:

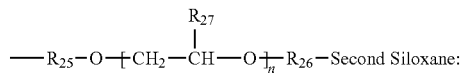

where $R_{25}$ is nil or a spacer; $R_{26}$ is nil or a spacer; $R_{27}$ is hydrogen, alkyl or aryl; second siloxane represents another siloxane and n is 1 to 12.

82. The battery of claim 72, wherein the solvent includes the one or more first siloxane and one or more of the first siloxanes is represented by:

$$R_{12}\!-\!\!\left[\!O\!-\!CH\!-\!CH_2\!\right]_{\!x}\!\!-\!O\!-\!R_8\!-\!\underset{\underset{R_6}{\overset{R_5}{|}}}{Si}\!-\!O\!-\!\underset{\underset{R_2}{\overset{R_1}{|}}}{Si}\!-\!O\!-\!\underset{\underset{R_2}{\overset{R_1}{|}}}{Si}\!-\!O\!-\!\underset{\underset{R_4}{\overset{R_3}{|}}}{Si}\!-\!R_7\!-\!O\!\!\left[\!CH_2\!-\!CH\!-\!O\!\right]_{\!y}\!\!-\!R_{11}:$$

wherein $R_1$ is an alkyl group; $R_2$ is an alkyl group; $R_3$ is an alkyl group or an aryl group; $R_4$ is an allyl group or an aryl group; $R_5$ is an alkyl group or an aryl group; $R_6$ is an alkyl group or an aryl group; $R_7$ is nil or a spacer, $R_8$ is nil or a spacer, $R_9$ is a hydrogen, an alkyl group or an aryl group; $R_{10}$ is a hydrogen, an alkyl group or an aryl group; $R_{11}$ is an alkyl group or an aryl group; and $R_{12}$ is an alkyl group or an aryl group; x is 1 or greater and/or 12 or less and y is 1 or greater and/or 12 or less.

83. The battery of claim 72, wherein the solvent includes the one or more second siloxanes and one or more of the second siloxanes is represented by $$Z_3Si\!-\!O\!-\!\underset{\underset{R_{22}}{\overset{R_{20}}{|}}}{Si}\!-\!O\!-\!\underset{\underset{R_{23}}{\overset{R_{21}}{|}}}{Si}\!-\!O\!-\!SiZ_3$$

wherein: $R_{20}$ is an alkyl group or an aryl group; $R_{21}$ is an alkyl group or an aryl group; $R_{22}$ is represented by Formula IV-A; $R_{23}$ is represented by Formula IV-B or N—C and each Z is an alkyl or an aryl group;

Formula IV-A:

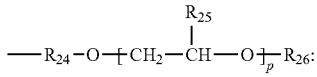

wherein $R_{24}$ is an organic spacer or nil; $R_{25}$ is hydrogen, alkyl or aryl; $R_{26}$ is alkyl or aryl and p is 1 or more and/or 12 or less;

Formula IV-B:

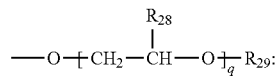

wherein $R_{28}$ is hydrogen, alkyl or aryl; $R_{29}$ is alkyl or aryl; q is 1 or more and/or 12 or less; and Formula IV-C:

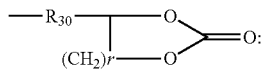

wherein $R_{30}$ is an organic spacer and r is 1 or 2.

84. The battery of claim 72, wherein the solvent includes one or more of the first siloxanes and at least one of the first siloxanes is a tetrasiloxane, a trisiloxane or a disiloxane.

85. The battery of claim 72, wherein the solvent includes one or more of the second siloxanes and at least one of the second siloxanes is a tetrasiloxane, a trisiloxane or a disiloxane.

86. A battery comprising:
an electrolyte activating one or more anodes and one or more cathodes, the electrolyte including one or more salts dissolved in a solvent, the solvent including
one or more first siloxanes and/or one or more first silanes, each of the first siloxanes and/or first silanes having one or more first substituents that each include a poly(alkylene oxide) moiety and each of the first siloxanes and/or first silanes excludes a cyclic carbonate moiety; and
one or more second siloxanes and/or one or more second silanes, each of the second siloxanes and/or second silanes having one or more second substituents that each include a carbonate moiety; and
the solvent including one or more components selected from the group consisting of the firstsiloxanes and the second siloxanes, wherein the one or more components are each a trisiloxane.

87. The battery of claim 86, wherein one or more of the first substituents is a nonerosslinking side-chain.

88. The battery of claim 86, wherein the poly(alkylene oxide) moiety includes an oxygen linked directly to a silicon in the one or more first siloxanes and/or the one or more first silanes.

89. The battery of claim 86, wherein one of the one or more components is represented by:

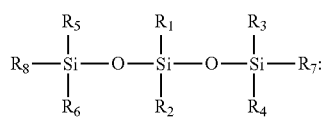

wherein $R_1$ is an alkyl group; $R_2$ is an alkyl group; $R_3$ is an alkyl group or an aryl group; $R_4$ is an alkyl group or an aryl group; $R_5$ is an alkyl group or an aryl group; $R_6$ is an alkyl group or an aryl group; $R_7$ is represented by Formula V-A or Formula V-B; $R_8$ is represented by Formula V-C or Formula V-D;

Formula V-A:

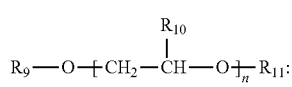

wherein $R_9$ is nil or a spacer; $R_{10}$ is hydrogen; alkyl or aryl; $R_{11}$ is alkyl or aryl; and n is 1 to 12;

Formula V-B:

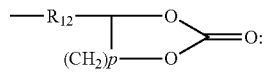

wherein $R_{12}$ is an organic spacer and p is 1 to 2;

Formula V-C:

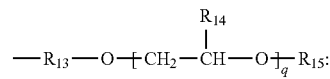

wherein $R_{13}$ is nil or a spacer, $R_{14}$ is hydrogen; alkyl or aryl; $R_{15}$ is alkyl or aryl; and q is 1 to 12; and Formula V-D:

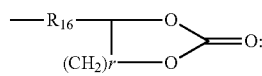

wherein $R_{16}$ is an organic spacer and p is 1 to 2.

90. The battery of claim 86, wherein one of the one or more components is represented by:

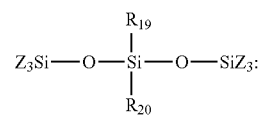

wherein $R_{19}$ is an alkyl group or an aryl group; $R_{20}$ is represented by Formula VI-A, Formula VI-B or Formula VI-C;

Formula VI-A:

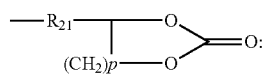

wherein $R_{21}$ is an organic spacer and p is 1 to 2;

Formula VI-B:

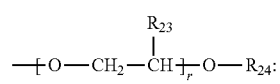

wherein $R_{23}$ is hydrogen; alkyl or aryl; $R_{24}$ is alkyl or aryl; and r is 1 to 12; and Formula VI-C:

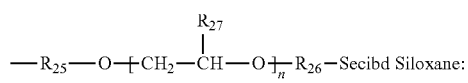

where $R_{25}$ is nil or a spacer; $R_{26}$ is nil or a spacer; $R_{27}$ is hydrogen, alkyl or aryl; second siloxane represents another siloxane and n is 1 to 12.

* * * * *